US010596739B2

(12) United States Patent
Washio et al.

(10) Patent No.: US 10,596,739 B2
(45) Date of Patent: Mar. 24, 2020

(54) MOLDED BODY

(71) Applicant: RIKEN TECHNOS CORPORATION, Tokyo (JP)

(72) Inventors: Nozomu Washio, Tokyo (JP); Taketo Hashimoto, Tokyo (JP); Jun Fujimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 15/559,357

(22) PCT Filed: Feb. 4, 2016

(86) PCT No.: PCT/JP2016/053357
§ 371 (c)(1),
(2) Date: Sep. 18, 2017

(87) PCT Pub. No.: WO2016/147734
PCT Pub. Date: Sep. 22, 2016

(65) Prior Publication Data
US 2018/0111303 A1 Apr. 26, 2018

(30) Foreign Application Priority Data

Mar. 18, 2015 (JP) .................................. 2015-054437
Jan. 19, 2016 (JP) .................................. 2016-007569

(51) Int. Cl.
*B29C 48/15* (2019.01)
*C09D 7/40* (2018.01)
(Continued)

(52) U.S. Cl.
CPC .............. *B29C 48/15* (2019.02); *B05D 1/005* (2013.01); *B05D 1/02* (2013.01); *B32B 1/00* (2013.01);
(Continued)

(58) Field of Classification Search
CPC .... B32B 27/30; B32B 27/20; B32B 2250/246
See application file for complete search history.

(56) References Cited

U.S. PATENT DOCUMENTS 3,496,143 A * 2/1970 Walter .................. B29C 51/002
264/292
6,489,015 B1 12/2002 Tsuchiya et al.
(Continued)

FOREIGN PATENT DOCUMENTS

CN 103492913 A 1/2014
CN 104422239 A 3/2015
(Continued)

OTHER PUBLICATIONS

Machine translation of JP 07094061 A, retrieved May 2019 (Year: 2019).*
(Continued)

*Primary Examiner* — Nicole M. Buie-Hatcher
(74) *Attorney, Agent, or Firm* — Bracewell LLP; Brad Y. Chin

(57) ABSTRACT

One embodiment provides a molded body that includes a resin substrate and in which: a part or all of the surface of the substrate is coated with a hard coat; a first hard coat is formed from a coating material that does not contain inorganic particles and that contains (A) 100 parts by mass of a polyfunctional (meth)acrylate, (B) 0.01-7 parts by mass of a water-repelling agent, and (C) 0.01-10 parts by mass of a silane coupling agent; and a second hard coat is formed from a coating material containing (A) 100 parts by mass of the polyfunctional (meth)acrylate and (D) 50-300 parts by mass of fine inorganic particles having an average particle size of 1-300 nm. Another embodiment provides a molded body that includes a resin substrate and in which a part or all of the surface of the substrate is coated with a hard coat, a first hard coat is formed from a coating material that does not
(Continued)

contain inorganic particles, a second hard coat is formed from a coating material containing inorganic particles, (i) the total light transmittance is 85% or more, and (ii) the pencil hardness of the surface of the first hard coat is 5H or more.

21 Claims, 2 Drawing Sheets

(51) Int. Cl.
    *B32B 27/18* (2006.01)
    *C08J 7/04* (2006.01)
    *B32B 1/00* (2006.01)
    *B32B 27/20* (2006.01)
    *B32B 27/30* (2006.01)
    *C09D 133/10* (2006.01)
    *C09D 135/02* (2006.01)
    *B05D 1/00* (2006.01)
    *B05D 1/02* (2006.01)
    *B29L 31/30* (2006.01)

(52) U.S. Cl.
    CPC ............ *B32B 27/18* (2013.01); *B32B 27/20* (2013.01); *B32B 27/30* (2013.01); *C08J 7/04* (2013.01); *C08J 7/042* (2013.01); *C09D 7/40* (2018.01); *C09D 133/10* (2013.01); *C09D 135/02* (2013.01); *B29L 2031/3055* (2013.01); *C08J 2333/00* (2013.01); *C08J 2355/02* (2013.01); *C08J 2367/00* (2013.01); *C08J 2369/00* (2013.01); *C08J 2433/10* (2013.01); *C08J 2435/02* (2013.01)

(56) References Cited

U.S. PATENT DOCUMENTS

| | | |
|---|---|---|
| 2005/0249942 A1 | 11/2005 | Coggio et al. |
| 2006/0134400 A1 | 6/2006 | Takada et al. |
| 2007/0231566 A1 | 10/2007 | Yoneyama et al. |
| 2012/0114892 A1 | 5/2012 | Jung et al. |
| 2014/0044891 A1 | 2/2014 | Shibata et al. |
| 2014/0208657 A1 | 7/2014 | Kim et al. |
| 2014/0227482 A1 | 8/2014 | Shibata et al. |
| 2014/0360975 A1 | 12/2014 | Hustad et al. |
| 2015/0203711 A1 | 7/2015 | Kang et al. |
| 2016/0122525 A1 | 5/2016 | Carloff et al. |
| 2016/0122573 A1 | 5/2016 | Uprety et al. |
| 2016/0229159 A1 | 8/2016 | Nakashima et al. |
| 2017/0183543 A1 | 6/2017 | Nagata et al. |
| 2017/0198164 A1 | 7/2017 | Itagaki et al. |

FOREIGN PATENT DOCUMENTS

| | | | |
|---|---|---|---|
| EP | 2873692 A1 | 5/2015 | |
| JP | S633011 A | 1/1988 | |
| JP | H0211665 A | 1/1990 | |
| JP | H0419142 A | 1/1992 | |
| JP | 07094061 A | * 4/1995 | |
| JP | 2000052472 A | 2/2000 | |
| JP | 2000190430 A | 7/2000 | |
| JP | 2000214791 A | 8/2000 | |
| JP | 2000517455 A | 12/2000 | |
| JP | 2002062405 A | 2/2002 | |
| JP | 2006058574 A | 3/2006 | |
| JP | 2006215488 A | * 8/2006 | ............ B26F 3/002 |
| JP | 2007537059 A | 12/2007 | |
| JP | 2008095064 A | 4/2008 | |
| JP | 2008201864 A | 9/2008 | |
| JP | 2009196125 A | 9/2009 | |
| JP | 2009279806 A | 12/2009 | |
| JP | 2010060190 A | 3/2010 | |
| JP | 2010064332 A | 3/2010 | |
| JP | 2010078642 A | 4/2010 | |
| JP | 2010511206 A | 4/2010 | |
| JP | 2010131771 A | 6/2010 | |
| JP | 2010208035 A | 9/2010 | |
| JP | 2010211150 A | 9/2010 | |
| JP | 2010224150 A | 10/2010 | |
| JP | 2010271400 A | 12/2010 | |
| JP | 2010275385 A | 12/2010 | |
| JP | 2011032350 A | 2/2011 | |
| JP | 2011032350 A1 | 2/2011 | |
| JP | 2011037927 A | 2/2011 | |
| JP | 2011512422 A | 4/2011 | |
| JP | 2011128439 A | 6/2011 | |
| JP | 2011175040 A | 9/2011 | |
| JP | 2011201087 A | 10/2011 | |
| JP | 2011213989 A | 10/2011 | |
| JP | 2012062385 A | 3/2012 | |
| JP | 2012234163 A | 11/2012 | |
| JP | 2012250438 A | 12/2012 | |
| JP | 2013075466 A | 4/2013 | |
| JP | 2013142113 A | 7/2013 | |
| JP | 2013173871 A | 9/2013 | |
| JP | 201431397 A | 2/2014 | |
| JP | 2014024332 A | 2/2014 | |
| JP | 2014025061 A | 2/2014 | |
| JP | 2014040017 A | 3/2014 | |
| JP | 2014043101 A | 3/2014 | |
| JP | 2014062709 A | 4/2014 | |
| JP | 2014080536 A | 5/2014 | |
| JP | 2014117904 A | 6/2014 | |
| JP | 2014143831 A | 8/2014 | |
| JP | 2014152237 A | 8/2014 | |
| JP | 2014201681 A | 10/2014 | |
| JP | 2014238614 A | 12/2014 | |
| JP | 2015013472 A | 1/2015 | |
| JP | 2015013473 A | 1/2015 | |
| JP | 2015016683 A | 1/2015 | |
| JP | 2015033851 A | 2/2015 | |
| JP | 2015034285 A | 2/2015 | |
| JP | 2015034286 A | 2/2015 | |
| JP | 2015083370 A | 4/2015 | |
| JP | 2015151420 A | 8/2015 | |
| JP | 2015182272 A | 10/2015 | |
| JP | 2015203770 A | 11/2015 | |
| JP | 2016011365 A | 1/2016 | |
| JP | 5870222 B1 | 2/2016 | |
| JP | 5878255 A | 3/2016 | |
| JP | 2016050285 A | 4/2016 | |
| JP | 2016060839 A | 4/2016 | |
| JP | 2016172423 A | 9/2016 | |
| JP | 2016172424 A | 9/2016 | |
| JP | WO2015098495 A1 | 3/2017 | |
| JP | 2017200042 A | 11/2017 | |
| KR | 20100129512 A | 12/2010 | |
| TW | 200609110 A | 3/2006 | |
| TW | 201300236 A | 1/2013 | |
| TW | 201420652 A | 6/2014 | |
| TW | 201437304 A | 10/2014 | |
| TW | 201504320 A | 2/2015 | |
| TW | 201602268 A | 1/2016 | |
| WO | 2005113690 A2 | 12/2005 | |
| WO | 2006102383 A1 | 9/2006 | |
| WO | 2008029766 A1 | 3/2008 | |
| WO | 2008067262 A1 | 6/2008 | |
| WO | 2009113537 A1 | 9/2009 | |
| WO | 2010079653 A1 | 7/2010 | |
| WO | 2011033976 A1 | 3/2011 | |
| WO | 2012144508 A1 | 10/2012 | |
| WO | 2012144510 A1 | 10/2012 | |
| WO | 2013129531 A1 | 9/2013 | |
| WO | 2014030848 A1 | 2/2014 | |
| WO | 2014203792 A1 | 12/2014 | |
| WO | 2015001948 A1 | 1/2015 | |
| WO | 2015005049 A1 | 1/2015 | |
| WO | 2015146565 A1 | 1/2015 | |
| WO | 2015033754 A1 | 3/2015 | |
| WO | 2015045823 A1 | 4/2015 | |
| WO | 2015171340 A1 | 11/2015 | |
| WO | 2015182253 A1 | 12/2015 | |

(56) References Cited

FOREIGN PATENT DOCUMENTS

| WO | 2016147733 A1 | 9/2016 |
|---|---|---|
| WO | 2016147734 A1 | 9/2016 |
| WO | 2016147776 A1 | 9/2016 |

OTHER PUBLICATIONS

Machine translation of JP 2006/215488 A, retrieved May 2019 (Year: 2019).*
EP16764565.4 Extended European Search Report dated Oct. 18, 2018; 8 pgs.
CN201680015850.6 Office Action dated Jan. 24, 2019; 10 pgs.
EP16764607.4 Search Report dated May 28, 2018; 8 pgs.
KR10-2016-7017502 Decision of Rejection dated May 10, 2018; 8 pgs.
CN201680015908.7 Office Action dated Feb. 2, 2019; 12 pgs.
CN201680015902.X Office Action dated Feb. 3, 2019; 15 pgs.
JP2017069555 Office Action dated Nov. 27, 2018; 8 pgs.
KR10-2019-7001505 Office Action dated Feb. 20, 2019; 12 pgs.
PCT/JP2016/084794 International Search Report dated Jan. 25, 2017; 2 pgs.
PCT/JP2016/084981 International Search Report dated Jan. 25, 2017; 2 pgs.
PCT/JP2017/027297 International Search Report dated Aug. 29, 2017; 2 pgs.
JP2017-152119 Office Action dated Aug. 7, 2018; 10 pgs.
PCT/JP2016/052927 International Search Report dated Apr. 19, 2016; 2 pgs.
PCT/JP2016/052950 International Search Report dated Apr. 19, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
PCT/JP2016/053357 International Search Report dated May 17, 2016; 2 pgs.
EP16764550.6 Extended European Search Report dated Oct. 18, 2018; 8 pgs.
EP16764570.4 Search Report dated May 28, 2018; 8 pgs.
CN201680015984.8 Office Action dated Nov. 5, 2018; 13 pgs.
CN201680015901.5 Office Action dated Jan. 28, 2019; 12 pgs.
EP16764564.7 Extended European Search Report dated Oct. 18, 2018; 8 pgs.
KR10-2016-7017502 Office Action dated Oct. 27, 2017; 18pgs.
TW105104029 Office Action dated Mar. 7, 2019; 12 pgs.
CN201580003516.4 Office Action dated Jan. 17, 2018; 20 pgs.
Lai, et al., Synthetic Process and Application of Silicone Products, 2nd Edition, Nov. 2009, 4 pgs.
EP15885519.7 Extended European Search Report dated Oct. 18, 2018; 8PGS.
PCT/JP2016/084981 International Preliminary Report on Patentability dated Jun. 21, 2018; 13 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
KR10-2017-7026048 Korean Office Action dated Nov. 1, 2018; 14 pgs.
JP6144330 Opposition Paper dated Dec. 5, 2017; 45 pgs.
Yamamoto, et al.; Application of Chemically Absorbed Fluorocarbon Film with Highly Durability as a Mold Release Agent; Seikei-Kakou vol. 22 No. 2, 2010; pp. 104-114.
Artham, et al., Biodegradation of Aliphatic and Aromatic Polycarbonates, Macromol. Biosci, 2008, 8, 14-24. (Year: 2008).
CN201680015900.0 Office Action dated Nov. 5, 2018; 12 pgs.
EP16868622.8 Extended European Search Report dated May 20, 2019; 8 pgs.
Chinese Patent Application No. 201680015900.0 dated Jun. 4, 2019; 8 pgs.
CN201680015902.X Second Office Action dated Jul. 17, 2019; 16 pgs.
EP16872835.0 Extended European Search Report dated Jul. 8, 2019; 6 pgs.
Chinese Patent Application No. 201680015984.8 dated Jun. 4, 2019; 8 pgs.
PCT/JP2017/040099 International Search Report dated Feb. 13, 2018; 4 pgs.
TW105104050 Office Action dated Aug. 20, 2019; 12 pgs.
TW105104027 Office Action dated Jun. 25, 2019; 21 pages.
JP2016-17863 Office Action dated Oct. 8, 2019; 11 pgs.
CN201680015984.8 Office Action dated Sep. 10, 2019, 13 pgs.
TW105104026 Office Action dated Oct. 5, 2019; 10 pgs.
CN201680068951.X Office Action dated Sep. 29, 2019; 21 pgs.
CN201680015900.0 Office Action dated Sep. 10, 2019, 13 pgs.
TW105104907 Office Action dated Oct. 18, 2019; 10 pages.
CN201810254960.9 Office Action dated Oct. 11, 2019, 13 pgs.
TW105104240 Office Action dated Oct. 17, 2019, 10 pgs.
JP2016-29588 Office Action dated Dec. 24, 2019, 7 pgs.
EP15885519.7 Third Party Observations dated Jan. 8, 2020, 85 pgs.
CN201811070889.5 Office Action dated Jan. 10, 2020, 15 pgs.
CN201680015902.X Office Action Jan. 2, 2020, 16 pgs.
JP02012111943A English Abstract, 2 pgs.

* cited by examiner (a)   (b)

MOLDED BODY

CROSS REFERENCE TO RELATED APPLICATIONS

This application claims the benefit of and priority to PCT/JP2016/053357, filed on Feb. 4, 2016, entitled (translation), "MOLDED BODY," which claims the benefit of and priority to Japanese Patent Application Nos. 2015-054437, filed on Mar. 18, 2015, and 2015-007569, filed on Jan. 19, 2016, each of which is hereby incorporated by reference in their entirety into this application.

BACKGROUND

Field

Embodiments relate to a molded body. More specifically, embodiments relate to a molded body having excellent surface hardness.

Description of Related Art

Conventionally, in order to impart functions such as surface hardness, abrasion resistance, durability, stain resistance, or designability to a molded body such as a housing of a household electric appliance or an information electronic device, or an instrument panel of an automobile, a surface of a substrate of an article has been often coated with a curable resin coating material such as an acrylic resin, a melamine resin, an isocyanate resin, or a urethane resin to form a coat. There are many proposals on techniques for improving abrasion resistance by forming a coat of a curable resin coating material (for example, see JP 2014-043101 A and JP 2014-040017 A). However, surface hardness and abrasion resistance of these coats are still insufficient, and a molded body capable of maintaining surface characteristics even after repeated wipes with a cloth or the like is required.

SUMMARY

An object of the various embodiments is to provide a molded body having excellent surface hardness. Another object of the various embodiments is preferably to provide a three-dimensionally molded body that is excellent in surface hardness and abrasion resistance.

According to at least one embodiment, the above object can be achieved by forming two kinds of specific hard coats in a molded body.

According to at least one embodiment, there is provided a molded body including a resin substrate, wherein a part or all of a surface of the substrate is coated with a hard coat, the hard coat includes, from a surface layer side, a first hard coat layer and a second hard coat layer, the first hard coat is formed of a coating material including (A) 100 parts by mass of a polyfunctional (meth)acrylate; (B) 0.01 to 7 parts by mass of a water-repelling agent; and (C) 0.01 to 10 parts by mass of a silane coupling agent, and containing no inorganic particles, and the second hard coat is formed of a coating material including: (A) 100 parts by mass of the polyfunctional (meth)acrylate; and (D) 50 to 300 parts by mass of inorganic fine particles having an average particle size of 1 to 300 nm.

According to at least one embodiment, the (C) silane coupling agent includes one or more selected from the group consisting of a silane coupling agent having an amino group and a silane coupling agent having a mercapto group.

According to at least one embodiment, the (B) water-repelling agent includes a (meth)acryloyl group-containing fluoropolyether water-repelling agent.

According to at least one embodiment, the second hard coat forming coating material further includes (E) 0.01 to 1 part by mass of a leveling agent.

According to at least one embodiment, the first hard coat forming coating material further includes (F) 0.1 to 15 parts by mass of resin fine particles having an average particle size of 0.5 to 10 μm.

According to at least one embodiment, the thickness of the first hard coat is from 0.5 to 5 μm.

According to at least one embodiment, the thickness of the second hard coat is from 5 to 30 μm.

According to another embodiment, there is provided a molded body including a resin substrate, wherein a part or all of a surface of the substrate is coated with a hard coat, the hard coat includes, from a surface layer side, a first hard coat layer and a second hard coat layer, the first hard coat is formed of a coating material containing no inorganic particles, the second hard coat is formed of a coating material containing inorganic particles, and the following (i) and (ii) are satisfied: (i) a total light transmittance of 85% or more; and (ii) a pencil hardness on the first hard coat surface of 5H or more.

According to another embodiment, there is provided a molded body including a resin substrate, wherein a part or all of a surface of the substrate is coated with a hard coat, the hard coat includes, from a surface layer side, a first hard coat layer and a second hard coat layer, the first hard coat is formed of a coating material containing no inorganic particles, the second hard coat is formed of a coating material containing inorganic particles, and the following (iii) and (iv) are satisfied: (iii) a water contact angle at the first hard coat surface of 100° or more; and (iv) a water contact angle at the first hard coat surface after 20,000 reciprocating wipes with a cotton of 100° or more.

According to at least one embodiment, the substrate has a three-dimensional shape.

According to at least one embodiment, the molded body described above has a shape in which an end portion thereof is chamfered.

According to at least one embodiment, there is provided an article including the molded body described above.

According to another embodiment, there is provided a method for producing the molded body described above, including: a step (1a) of molding a resin sheet three-dimensionally to produce the substrate; a step (2) of forming the second hard coat on a part or all of a surface of the substrate obtained in the step (1a); and a step (3) of forming the first hard coat on a surface of the second hard coat formed in the step (2).

According to another embodiment, there is provided a method for producing the molded body described above, including: a step (1b) of molding a thermoplastic resin to produce the substrate; a step (2) of forming the second hard coat on a part or all of a surface of the substrate obtained in the step (1b); and a step (3) of forming the first hard coat on a surface of the second hard coat formed in the step (2).

According to another embodiment, there is provided a method for producing the molded body described above, including: a step (1c) of molding a curable resin to produce the substrate; a step (2) of forming the second hard coat on a part or all of a surface of the substrate obtained in the step (1c); and a step (3) of forming the first hard coat on a surface of the second hard coat formed in the step (2).

According to another embodiment, there is provided a method for producing the article described above, including: a step of producing a molded body by the method described in any one of [13] to [15]; and a step (4) of producing the article using the molded body thus obtained.

Embodiments provide non-obvious advantages over the convention art. For example, a molded body according to at least one embodiment has excellent surface hardness. A molded body according to at least one embodiment has any three-dimensional shape, and it is excellent in surface hardness and abrasion resistance. Therefore, the molded body according to at least one embodiment can be suitably used as a housing of a household electric appliance such as a television, a refrigerator, a washing machine, a vacuum cleaner, a microwave oven, or an air conditioner, or the like. The molded body according to at least one embodiment can be also suitably used as a housing of an information electronic apparatus such as a smartphone, a tablet terminal, a car navigation system, a digital camera, or a personal computer, a curved display face plate, or the like. Furthermore, the molded body according to at least one embodiment can be suitably used as an instrument panel, a window, a shift knob, or the like of an automobile.

DETAILED DESCRIPTION

Figure 1:
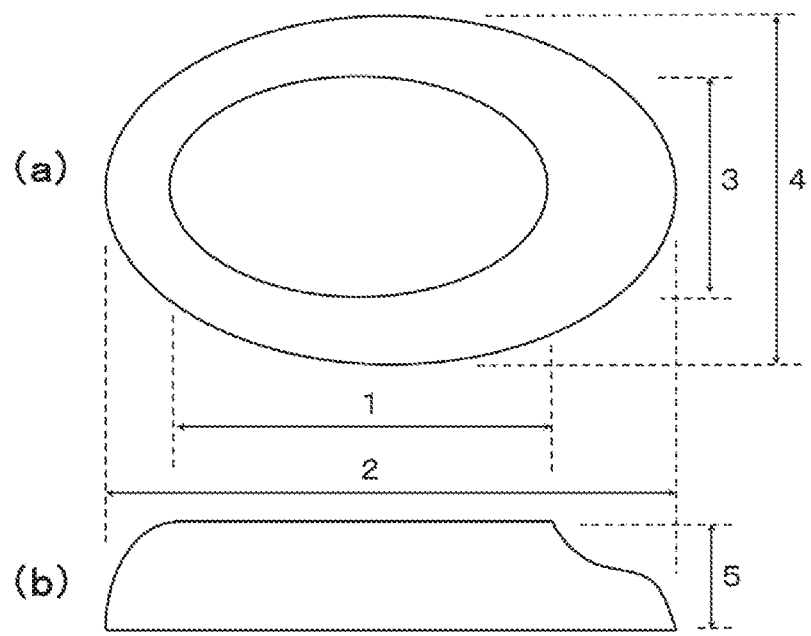
FIG. 1 illustrates a plan view (a) and a side view (b) illustrating a substrate prepared in Examples.

The term "resin" referred to herein is used as a term including a resin mixture including two or more resins and a resin composition including a component(s) other than a resin. The term "sheet" referred to herein is used as a term including a film and a board.

1. Substrate

The molded body according to at least one embodiment has a resin substrate. The substrate imparts a desired shape to the molded body according to at least one embodiment. The substrate preferably imparts mechanical physical properties such as impact resistance, strength, and rigidity to the molded body according to at least one embodiment.

The shape of the substrate is not particularly limited, but may be a desired shape. The shape of the substrate may be a planar shape. However, when the molded body according to at least one embodiment is used for a housing of a household electric appliance, an instrument panel of an automobile, or the like, the shape is usually a three-dimensional shape.

A method of producing the substrate is not particularly limited, but the substrate can be produced by molding any resin by any method.

1-1. Substrate Produced by Forming Resin Sheet Three-Dimensionally

Preferable examples of a method for producing the substrate include a method for subjecting a resin sheet to so-called three-dimensional molding such as membrane pressing, pressure forming, vacuum forming, or vacuum pressure molding.

The thickness of the resin sheet is not particularly limited, but may be usually 0.1 mm or more, preferably 0.2 mm or more, more preferably 0.5 mm or more, still more preferably 0.8 mm or more, and most preferably 1 mm or more from a viewpoint of retaining strength and rigidity required as a substrate of a molded body. At the same time, the thickness of the resin sheet may be usually 10 mm or less, preferably 6 mm or less, and more preferably 3 mm or less from a viewpoint of meeting a requirement for weight reduction of an article and three-dimensional formability. The thickness of the resin sheet may be usually 0.1 mm or more and 10 mm or less, and preferably 0.1 mm or more and 6 mm or less, 0.1 mm or more and 3 mm or less, 0.2 mm or more and 10 mm or less, 0.2 mm or more and 6 mm or less, 0.2 mm or more and 3 mm or less, 0.5 mm or more and 10 mm or less, 0.5 mm or more and 6 mm or less, 0.5 mm or more and 3 mm or less, 0.8 mm or more and 10 mm or less, 0.8 mm or more and 6 mm or less, 0.8 mm or more and 3 mm or less, 1 mm or more and 10 mm or less, 1 mm or more and 6 mm or less, or 1 mm or more and 3 mm or less.

The tensile elastic modulus of the resin sheet is not particularly limited, but may be preferably 1500 MPa or more, and more preferably 1800 MPa or more from a viewpoint of retaining strength and rigidity required as a substrate of a molded body. The upper limit of the tensile elastic modulus is not particularly specified. However, the tensile elastic modulus is about 10000 MPa at most within a range usually available. The tensile elastic modulus was measured according to JIS K7127:1999 under conditions of a test piece type 1B and a pulling rate of 50 mm/min.

The glass transition temperature of a resin constituting the resin sheet is not particularly limited, but may be usually 80° C. or higher, preferably 90° C. or higher, more preferably 100° C. or higher, and still more preferably 110° C. or higher from a viewpoint of retaining heat resistance (including both heat resistance required at the time of manufacturing a molded body and heat resistance required at the time of using the molded body). Incidentally, when the resin sheet includes two or more kinds of resins as constituent resins, a resin having the lowest glass transition temperature among these resins preferably satisfies the above range.

The glass transition temperature of a resin constituting the resin sheet is usually 170° C. or lower, preferably 160° C. or lower, and more preferably 155° C. or lower from a viewpoint of processability in three-dimensional molding to obtain the substrate. Incidentally, when the resin sheet includes two or more kinds of resins as constituent resins, a resin having the highest glass transition temperature among these resins preferably satisfies the above range.

The glass transition temperature of a resin constituting the resin sheet may be preferably 80° C. or higher and 170° C. or lower, and more preferably 80° C. or higher and 160° C. or lower, 80° C. or higher and 155° C. or lower, 90° C. or higher and 170° C. or lower, 90° C. or higher and 160° C. or lower, 90° C. or higher and 155° C. or lower, 100° C. or higher and 170° C. or lower, 100° C. or higher and 160° C. or lower, 100° C. or higher and 155° C. or lower, 110° C. or higher and 170° C. or lower, 110° C. or higher and 160° C. or lower, or 110° C. or higher and 155° C. or lower.

Figure 2:
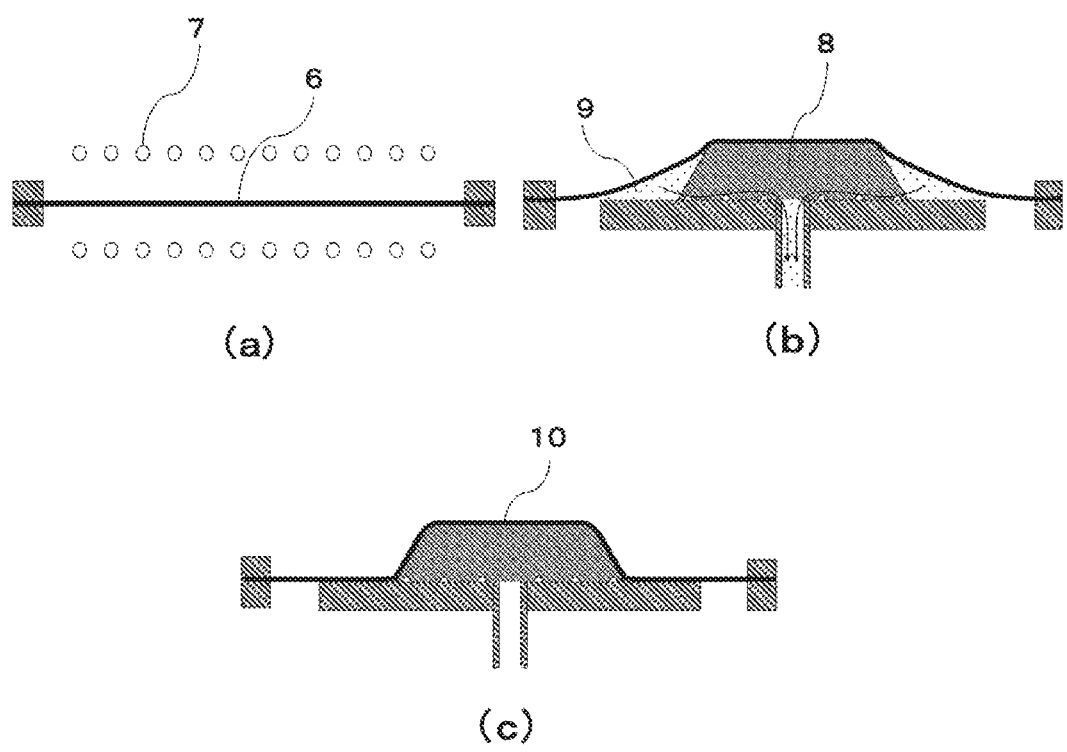
FIG. 2 is a diagram for explaining manufacture of a substrate by a vacuum forming method.

Here, the glass transition temperature is an intermediate point glass transition temperature calculated by drawing a graph according to FIG. 2 of ASTM D3418 for glass transition appearing in a curve measured in the last temperature-rising process in a temperature program for heating a sample to 200° C. at a temperature-rising rate of 50° C./min., holding the sample at 200° C. for 10 minutes, then cooling the sample to 50° C. at a temperature-falling rate of 20° C./min., holding the sample at 50° C. for 10 minutes, and then heating the sample to 200° C. at a temperature-rising rate of 20° C./min. using a Diamond DSC type differential scanning calorimeter available from Perkin Elmer Japan Co., Ltd.

Examples of the resin sheet include resin sheets formed of a polyester resin such as an aromatic polyester or an aliphatic polyester, an acrylic resin such as polymethyl methacrylate, polyethyl methacrylate, or a vinyl cyclohexane-methyl (meth)acrylate copolymer, a poly(meth)acrylimide resin; a polycarbonate resin such as an aromatic polycarbonate or an aliphatic polycarbonate; a polyolefin resin such as polyethylene, polypropylene, polybutene-1, or poly-4-methyl-pentene-1; a cellulose resin such as cellophane, triacetylcellulose, diacetylcellulose, or acetylcellulose butyrate; a styrene resin such as polystyrene, an acrylonitrile-styrene copolymer (AS resin), an acrylonitrile-butadiene-styrene copolymer resin (ABS resin), a styrene-ethylene-propylene-styrene copolymer, a styrene-ethylene-ethylene-propylene-styrene copolymer, or a styrene-ethylene-butadiene-styrene copolymer; a cyclic hydrocarbon resin such as an ethylene-norbornene copolymer; a polyamide resin such as nylon 6, nylon 66, nylon 12, or nylon 11; a polyvinyl chloride resin such as polyvinyl chloride or a vinyl chloride-vinyl acetate copolymer; a polyvinylidene chloride resin; a fluorine-containing resin such as polyvinylidene fluoride; polyvinyl alcohol, ethylene vinyl alcohol, polyether ether ketone, polyimide, polyurethane, polyetherimide, polysulfone, a polyethersulfone polyarylate resin, and a polymer type urethane acrylate resin. These sheets include an unstretched sheet, a uniaxially stretched sheet, and a biaxially stretched sheet. These sheets also include a laminated sheet obtained by laminating two or more layers of one or more kinds thereof. Furthermore, these resin sheets may be transparent, or may be colored with any colorant.

When the resin sheet is a laminated sheet, a lamination method is not limited, but lamination can be performed by any method. Examples thereof include a method for obtaining each resin sheet by any method and then subjecting the resulting resin sheet to dry lamination or heat lamination; a method for melting each constituent material with an extruder, and obtaining a laminated sheet by T-die co-extrusion using a feed block process, a multi-manifold process, or a stack plate process; an extrusion lamination method for obtaining at least one resin sheet by any method and then melting and extruding another resin sheet onto the resin sheet; a method for melting and extruding a constituent material onto any film substrate or applying and drying a coating material including a constituent material and a solvent thereonto, peeling the formed resin sheet from the film substrate, and transferring the resin sheet onto another resin sheet; and a method for combining two or more of these methods.

Among these sheets, from a viewpoint of mechanical physical properties and surface hardness, preferable examples of the resin sheet include:

(a1) an acrylic resin sheet;
(a2) an aromatic polycarbonate resin sheet;
(a3) a polyester resin sheet (excluding a resin sheet formed of an acrylic resin or an aromatic polycarbonate resin), and
(a4) a laminated sheet formed of any one or two or more of the resin sheets (a1) to (a3).

The (a1) acrylic resin sheet is a sheet formed of a resin composition mainly including an acrylic resin such as polymethylmethacrylate or polyethylmethacrylate (usually more than 50% by mass, preferably 60% by mass or more, more preferably 70% by mass or more).

Examples of the acrylic resin include a (meth)acrylate (co)polymer, a copolymer of comonomers including a (meth)acrylate, and a modified product thereof. Note that the term (meth)acrylic means acrylic or methacrylic. The term (co)polymer means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer of comonomers including a (meth)acrylate include an ethylene-methyl (meth)acrylate copolymer, a styrene-methyl (meth)acrylate copolymer, a vinyl cyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidating agent (for example, methylamine, cyclohexylamine, or ammonia) (hereinafter, also referred to as a "poly (meth)acrylimide resin").

The poly(meth)acrylimide resin is a thermoplastic resin obtained by introducing characteristics of excellent heat resistance and excellent dimensional stability derived from a polyimide resin and overcoming a drawback of being colored from pale yellow to reddish brown while high transparency, high surface hardness, and high rigidity derived from an acrylic resin are retained. Such a poly(meth)acrylimide resin is disclosed in JP 2011-519999 A, for example. The term poly(meth)acrylimide herein means polyacrylimide or polymethacrylimide. Commercially available examples of the poly(meth)acrylimide resin include "PLEXIMID TT50" (trade name) and "PLEXIMID TT70" available from Evonik Industries AG.

As the acrylic resin, these compounds can be used singly or in a mixture of two or more kinds thereof.

Preferable examples of an optional component which can be contained in the acrylic resin include a core-shell rubber. By using the core-shell rubber in an amount of 0 to 40 parts by mass (100 to 60 parts by mass of the acrylic resin), preferably in an amount of 0 to 30 parts by mass (100 to 70 parts by mass of the acrylic resin) relative to 100 parts by mass of the total amount of the acrylic resin and the core-shell rubber, cutting processability and impact resistance of the (a1) acrylic resin sheet can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. As the core-shell rubber, these compounds can be used singly or in a mixture of two or more kinds thereof.

Examples of other optional component which can be contained in the acrylic resin include a thermoplastic resin other than the acrylic resin and the core-shell rubber, a pigment, an inorganic filler, an organic filler, and a resin filler, and an additive such as a lubricant, an antioxidant, a weather resistance stabilizer, a heat stabilizer, a release agent, an antistatic agent, a nucleating agent, or a surfactant.

The blending amount of the optional component(s) may be usually 25 parts by mass or less, and preferably about from 0.01 to 10 parts by mass relative to 100 parts by mass of the total amount of the acrylic resin and the core-shell rubber.

The (a2) aromatic polycarbonate resin sheet is a sheet formed of a resin mainly including an aromatic polycarbonate resin (usually more than 50% by mass, preferably 70% by mass or more, more preferably 90% by mass or more).

Examples of the aromatic polycarbonate resin include a polymer obtained by an interfacial polymerization method between an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate. As the aromatic polycarbonate resin, these compounds can be used singly or in a mixture of two or more kinds thereof.

Preferable examples of an optional component which can be contained in the aromatic polycarbonate resin include a core-shell rubber. By using the core-shell rubber in an amount of 0 to 30 parts by mass (100 to 70 parts by mass of the aromatic polycarbonate resin), preferably in an amount of 0 to 10 parts by mass (100 to 90 parts by mass of the aromatic polycarbonate resin) relative to 100 parts by mass of the total amount of the aromatic polycarbonate resin and the core-shell rubber, cutting processability and impact resistance of the (a2) aromatic polycarbonate resin sheet can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. As the core-shell rubber, these compounds can be used singly or in a mixture of two or more kinds thereof.

The aromatic polycarbonate resin can further include, within a range not contrary to an object according to at least one embodiment, a thermoplastic resin other than an aromatic polycarbonate resin and a core-shell rubber; a pigment, an inorganic filler, an organic filler, and a resin filler, an additive such as a lubricant, an antioxidant, a weather resistance stabilizer, a heat stabilizer, a release agent, an antistatic agent, or a surfactant; or the like, as desired. The blending amount of the optional component(s) may be usually about from 0.01 to 10 parts by mass relative to 100 parts by mass of the total amount of the aromatic polycarbonate resin and the core-shell rubber.

The (a3) polyester resin sheet is a sheet formed of a resin mainly including a polyester resin such as polyethylene terephthalate (usually more than 50 mass %, preferably 80 mass % or more, more preferably 90 mass % or more) (excluding the (a1) acrylic resin sheet and the (a2) aromatic polycarbonate resin sheet). This polyester resin sheet includes an unstretched sheet, a uniaxially stretched sheet, and a biaxially stretched sheet. The polyester resin sheet also includes a laminated sheet obtained by laminating two or more layers of one or more kinds thereof.

The (a3) polyester resin sheet is preferably a sheet formed of a resin mainly including an amorphous or low crystalline aromatic polyester resin (usually more than 50% by mass, preferably 80% by mass or more, more preferably 90% by mass or more).

Examples of the amorphous or low crystalline aromatic polyester resin include a polyester copolymer formed of an aromatic polycarboxylic acid component such as terephthalic acid, isophthalic acid, orthophthalic acid, or naphthalene dicarboxylic acid, and a polyhydric alcohol component such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol, or 1,4-cyclohexanedimethanol.

Examples of the amorphous or low crystalline aromatic polyester resin include one or a mixture of two or more selected from a glycol-modified polyethylene terephthalate (PETG) including 50% by mole of terephthalic acid, 30 to 40% by mole of ethylene glycol, and 10 to 20% by mole of 1,4-cyclohexanedimethanol; a glycol-modified polycyclohexylenedimethylene terephthalate (PCTG) including 50% by mole of terephthalic acid, 16 to 21% by mole of ethylene glycol, and 29 to 34% by mole of 1,4-cyclohexanedimethanol; an acid-modified polycyclohexylenedimethylene terephthalate (PCTA) including 25 to 49.5% by mole of terephthalic acid, 0.5 to 25% by mole of isophthalic acid, and 50% by mole of 1,4-cyclohexanedimethanol; an acid-modified and glycol-modified polyethylene terephthalate including 30 to 45% by mole of terephthalic acid, 5 to 20% by mole of isophthalic acid, 35 to 48% by mole of ethylene glycol, 2 to 15% by mole of neopentyl glycol, less than 1% by mole of diethylene glycol, and less than 1% by mole of bisphenol A; and an acid-modified and glycol-modified polyethylene terephthalate including 45 to 50% by mole of terephthalic acid, 5 to 0% by mole of isophthalic acid, 25 to 45% by mole of 1,4-cyclohexanedimethanol, and 25 to 5% by mole of 2,2,4,4,-tetramethyl-1,3-cyclobutanediol, relative to 100% by mole of the total amount of monomers.

Here, a polyester having a heat of fusion of 10 J/g or less is defined as an amorphous polyester, and a polyester having a heat of fusion of more than 10 J/g and 60 J/g or less is defined as a low crystalline polyester. The heat of fusion is determined by a second fusion curve (i.e. a fusion curve measured in the last temperature-rising process) measured in a temperature program for maintaining a sample at 320° C. for 5 minutes, then cooling the sample to −50° C. at a temperature-falling rate of 20° C./min., holding the sample at −50° C. for 5 minutes, and then heating the sample to 320° C. at a temperature-rising rate of 20° C./min using a Diamond DSC type differential scanning calorimeter available from Perkin Elmer Japan Co., Ltd.

The polyester resin may include other component(s) within a range not contrary to an object according to at least one embodiment, as desired. Examples of an optional component which can be contained include a thermoplastic resin other than a polyester resin; a pigment, an inorganic filler, an organic filler, and a resin filler, and an additive such as a lubricant, an antioxidant, a weather resistance stabilizer, a heat stabilizer, a release agent, an antistatic agent, or a surfactant. The blending amount of the optional component(s) may be usually 25 parts by mass or less, and preferably about from 0.01 to 10 parts by mass relative to 100 parts by mass of the polyester resin.

Preferable examples of an optional component which can be contained in the polyester resin include a core-shell rubber. By using the core-shell rubber, impact resistance of the (a3) polyester resin sheet can be improved.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. As the core-shell rubber, these compounds can be used singly or in a mixture of two or more kinds thereof.

The blending amount of the core-shell rubber is preferably 0.5 parts by mass or more relative to 100 parts by mass of the polyester resin in order to improve impact resistance. In addition, when a transparent substrate is produced, the blending amount of the core-shell rubber may be preferably 5 parts by mass or less, and more preferably 3 parts by mass or less in order to retain transparency.

For example, the (a4) laminated sheet formed of any one or more of the resin sheets (a1) to (a3) can be obtained by performing co-extrusion film formation so as to obtain a desired layer configuration using any co-extrusion apparatus such as a feed block type, a multi-manifold type, or a stack plate type, by obtaining any one or more of the resin sheets (a1) to (a3) using any film forming apparatus and then subjecting the resulting resin sheet(s) to heat lamination or dry lamination so as to obtain a desired layer configuration; or by obtaining any one of the resin sheets (a1) to (a3) using any film forming apparatus and then subjecting the resulting resin sheet as a substrate to extrusion lamination so as to obtain a desired layer configuration.

In the resin sheet, a printed layer may be provided on a surface on which the second hard coat is formed in order to enhance the sense of design, as desired. When the resin sheet is a transparent resin sheet, the printed layer may be provided on a surface opposite to the surface on which the second hard coat is formed. The printed layer is provided in order to impart high designability to the molded body according to at least one embodiment. The printed layer can be formed by printing any pattern using any ink and any printing machine.

The printed layer can be formed on a desired surface of the resin sheet directly or via an anchor coat entirely or partially. The printed layer may be formed on a surface of an arbitrary resin film, and may be laminated on a desired surface of the resin sheet directly or via an anchor coat. In this case, the arbitrary resin film may be laminated as it is or may be removed. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane resin, a vinyl chloride-vinyl acetate copolymer resin, a vinyl chloride-vinyl acetate-acrylate copolymer resin, a chlorinated polypropylene resin, an acrylic resin, a polyester resin, a polyamide resin, a butyral resin, a polystyrene resin, a nitrocellulose resin, or a cellulose acetate resin, and a resin composition thereof. In addition, in order to provide a metal-like design, aluminum, tin, titanium, indium, an oxide thereof, or the like may be vapor-deposited directly or via an anchor coat entirely or partially on a desired surface of the resin sheet by a known method.

A method for producing a substrate by a vacuum molding method using the resin sheet will be described. FIG. 1 illustrates an example of a substrate produced by a vacuum molding method in Examples described below (FIG. 1(a) is a plan view and FIG. 1(b) is a side view). FIG. 2 illustrates an example of manufacture of a substrate by a vacuum molding method. First, the resin sheet 6 is heated and softened using an infrared heater 7 or the like (FIG. 2(a)).

Subsequently, the softened resin sheet 6 is removed from the infrared heater 7, and an upper surface of a molding die 8 is quickly coated with the resin sheet 6 (FIG. 2(b)). Subsequently, a space 9 between the resin sheet 6 and the molding die 8 is depressurized, and the resin sheet 6 is brought into close contact with the molding die 8 to obtain a substrate 10 (FIG. 2(c)). The pressure in the space 9 is preferably 10 kPa or less, and more preferably 1 kPa or less from a viewpoint of sufficiently bringing the resin sheet 6 and the molding die 8 into close contact with each other without leaving air therebetween. A smaller pressure in the space 9 is more preferable due to a larger adhesion force from a viewpoint of an adhesion force. On the other hand, practically, the lower limit of the pressure in the space 9 may be about $10^{-5}$ KPa in consideration of cost increase at an accelerating rate for reducing the pressure in the space 9 and a mechanical strength of the resin sheet 6.

1-2. Substrate Produced by Molding Thermoplastic Resin

Preferable examples of a method for producing the substrate include injection molding, blow molding, and extrusion molding of a thermoplastic resin. Among these methods, injection molding is preferable from a viewpoint of the degree of freedom of a shape. Here, the injection molding also includes insert molding. As a resin sheet to be inserted into a molding die, the above-described sheets can be used.

A thermoplastic resin for constituting the substrate is not particularly limited, but any thermoplastic resin can be used. The thermoplastic resin for constituting the substrate is not limited as long as the thermoplastic resin can be preferably applied to at least one of injection molding, blow molding, and extrusion molding, more preferably applied to injection molding.

Examples of the thermoplastic resin include a polyester resin such as an aromatic polyester or an aliphatic polyester, an acrylic resin; a polycarbonate resin; a poly(meth)acrylimide resin; a polyolefin resin such as polyethylene, polypropylene, or polymethylpentene; a cellulose resin such as cellophane, triacetylcellulose, diacetylcellulose, or acetylcellulose butyrate; a styrene resin such as polystyrene, an acrylonitrile-styrene copolymer resin (AS resin), an acrylonitrile-butadiene-styrene copolymer (ABS resin), a styrene-ethylene-propylene-styrene copolymer, a styrene-ethylene-ethylene-propylene-styrene copolymer, or a styrene-ethylene-butadiene-styrene copolymer, a polyvinyl chloride resin; a polyvinylidene chloride resin; a fluorine-containing resin such as polyvinylidene fluoride; polyvinyl alcohol, ethylene vinyl alcohol, polyether ether ketone, nylon, polyamide, polyurethane, polyetherimide, polysulfone, and polyethersulfone. As the thermoplastic resin, these compounds can be used singly or in a mixture of two or more kinds thereof.

When the molded body according to at least one embodiment is used for a housing of a household electric appliance or an information electronic device, an instrument panel of an automobile, or the like, among these thermoplastic resins, a resin having excellent mechanical physical properties such as impact resistance, strength, and rigidity is preferable. Examples of such a thermoplastic resin as described above include an acrylic resin such as polymethyl methacrylate, polyethyl methacrylate, or a vinyl cyclohexane-methyl (meth)acrylate copolymer, a styrene resin such as polystyrene, an acrylonitrile-styrene copolymer, or an acrylonitrile-butadiene-styrene copolymer (ABS resin); an aromatic polyester resin; an aromatic polycarbonate resin; and a polyolefin resin such as polyethylene or polypropylene.

As the thermoplastic resin, these compounds can be used singly or in a mixture of two or more kinds thereof.

The thermoplastic resin can include, within a range not contrary to an object according to at least one embodiment, a component other than a thermoplastic resin, for example, an antioxidant such as a phosphorus type, a phenol type, or a sulfur type; a weather resistance agent such as an anti-aging agent, a light stabilizer, or an ultraviolet absorber, a copper inhibitor, a lubricant such as modified silicone oil, silicone oil, wax, acid amide, fatty acid, or a fatty acid metal salt; a nucleating agent such as an aromatic phosphoric acid metal salt type or a gelol type; an antistatic agent such as a glycerin fatty acid ester; a filler such as calcium carbonate, talc, magnesium hydroxide, mica, clay, barium sulfate, natural silicic acid, synthetic silicic acid (white carbon), titanium oxide, a cellulose fiber, a glass fiber, or carbon black; an organic flame retardant; and an inorganic flame retardant, as desired.

1-3. Substrate Produced by Molding Curable Resin

Preferable examples of a method for producing the substrate include a method for injecting a curable resin into a die having a desired shape and curing the curable resin.

The curable resin for constituting the substrate is a resin which can be cured with heat or an active energy ray. The curable resin is not particularly limited, but any curable resin can be used. Examples of the curable resin include a resin having two or more reactive functional groups in one molecule; and a resin composition formed of the resin and at least one selected from an isocyanate curing agent (i.e. a compound having two or more isocyanate groups (—N=C=O) in one molecule), a photopolymerization initiator, an organic peroxide, and the like. Examples of the reactive functional group include an amino group, a vinyl group, an epoxy group, a methacryloxy group, an acryloxy group, an isocyanate group, an alkoxy group, an acyloxy group, and a halogen group.

Examples of the curable resin include an active energy ray-curable resin; and an active energy ray-curable resin composition including the resin together with an isocyanate curing agent (i.e. a compound having two or more isocyanate groups (—N=C=O) in one molecule) and/or a photopolymerization initiator. The active energy ray-curable resin is a resin which can be polymerized and cured by an active energy ray such as an ultraviolet ray or an electron beam.

Examples of the active energy ray-curable resin include a (meth)acryloyl group-containing prepolymer or oligomer such as polyurethane (meth)acrylate, polyester (meth)acrylate, polyacryl (meth)acrylate, epoxy (meth)acrylate, polyalkylene glycol poly(meth)acrylate, or polyether (meth)acrylate; a (meth)acryloyl group-containing monofunctional reactive monomer such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth) acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth) acrylate, or trimethylsiloxyethyl methacrylate; a monofunctional reactive monomer such as N-vinylpyrrolidone or styrene; a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate or trimethylolethane tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (oligomer or prepolymer) including one or more of these monomers as constituent monomers. As the active energy ray-curable resin, these compounds can be used singly or in a mixture of two or more kinds thereof. It should be noted that the term (meth)acrylate herein means an acrylate or a methacrylate.

Examples of the isocyanate curing agent include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as blocked isocyanates of the polyisocyanates. These isocyanate curing agents can be used singly or in combination of two or more kinds thereof. In crosslinking, a catalyst such as dibutyltin dilaurate or dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin compound such as benzoin, benzoin methyl ether, benzoin ethyl ether, benzoin isopropyl ether, or benzyl methyl ketal; an acetophenone compound such as acetophenone, 2,2-dimethoxy-2-phenylacetophenone, or 1-hydroxycyclohexyl phenyl ketone; an anthraquinone compound such as methylanthraquinone, 2-ethylanthraquinone, or 2-amylanthraquinone; a thioxanthone compound such as thioxanthone, 2,4-diethylthioxanthone, or 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. As the photopolymerization initiator, these compounds can be used singly or in a mixture of two or more kinds thereof.

The curable resin composition can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a colorant, and a filler, as desired. The curable resin composition may include a solvent as desired for dilution to a concentration which allows easy molding. The solvent is not particularly limited as long as the solvent neither reacts with components of the curable resin composition and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. The curable resin composition can be obtained by mixing and stirring these components.

2. Hard Coat

In the molded body according to at least one embodiment, a part or all of a surface of the substrate is covered with a hard coat. The hard coat serves to improve surface hardness of the molded body according to at least one embodiment, and preferably improves abrasion resistance thereof. The hard coat may have high transparency from a viewpoint of designability. Preferably, the hard coat itself is not colored so as to facilitate coloring to a desired color from a viewpoint of a design property. A part or all of a surface of the substrate may be coated with the hard coat depending on the shape, application, and usage of the molded body according to at least one embodiment. The hard coat includes a first hard coat layer and a second hard coat layer from a surface layer side.

The "surface layer side" referred to herein means a side closer to an outer surface (for example, an outer side of a household electric appliance) when an article including a molded body having first and second hard coat layers is used on site. In addition, here, disposing one layer on a "surface layer side" of another layer includes that these layers are in direct contact with each other and that another single layer or a plurality of other layers is interposed therebetween.

2-1. First Hard Coat

The first hard coat is formed of a coating material containing no inorganic particles. The first hard coat is preferably formed of a coating material including (A) 100 parts by mass of a polyfunctional (meth)acrylate, (B) 0.01 to 7 parts by mass of a water-repelling agent, and (C) 0.01 to 10 parts by mass of a silane coupling agent, and containing no inorganic particles.

The first hard coat usually forms a surface of the molded body according to at least one embodiment. When an article is produced using the molded body according to at least one embodiment, the first hard coat usually forms a surface of the article. The first hard coat preferably exhibits good abrasion resistance, and maintains surface characteristics such as water-repellency even after repeated wipes with a handkerchief or the like.

Inorganic particles (for example, silica (silicon dioxide); metal oxide particles formed of aluminum oxide, zirconia, titania, zinc oxide, germanium oxide, indium oxide, tin oxide, indium tin oxide, antimony oxide, cerium oxide, or the like; metal fluoride particles formed of magnesium fluoride, sodium fluoride, or the like; metal sulfide particles; metal nitride particles; and metal particles) are highly effective in enhancing hardness of a hard coat. On the other hand, an interaction between the inorganic particles and a resin component such as the (A) polyfunctional (meth)acrylate of component is weak, resulting in insufficient abrasion resistance. Therefore, the present invention has solved this problem by allowing the first hard coat usually forming an outermost surface to contain no inorganic particles for retaining abrasion resistance, and allowing the second hard coat to preferably contain a specific amount of inorganic particles having an average particle size of 1 to 300 nm for enhancing hardness.

Here, "containing no" inorganic particles means not containing a significant amount of inorganic particles. In the field of a hard coat forming coating material, the significant amount of inorganic particles is usually about 1 part by mass or more relative to 100 parts by mass of the (A) polyfunctional (meth)acrylate of component. Therefore, "containing no" inorganic particles can be paraphrased as follows. That is, the amount of inorganic particles is usually 0 parts by mass or more and usually less than 1 part by mass, preferably 0.1 part by mass or less, and more preferably 0.01 part by mass or less relative to 100 parts by mass of component (A).

(A) Polyfunctional (meth)acrylate

The (A) polyfunctional (meth)acrylate of component is a (meth)acrylate having two or more (meth)acryloyl groups in one molecule. This component has two or more (meth)acryloyl groups in one molecule, and therefore acts to form a hard coat through polymerization and curing with an active energy ray such as an ultraviolet ray or an electron beam.

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate, trimethylolethane tri(meth)acrylate, or pentaerythritol tri(meth)acrylate; a (meth)acryloyl group-containing tetrafunctional reactive monomer such as pentaerythritol tetra(meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (oligomer and prepolymer) containing one or more kinds thereof as constituent monomers. As the (A) polyfunctional (meth)acrylate of component, these compounds can be used singly or in a mixture of two or more kinds thereof. Here, the term (meth)acrylate means an acrylate or a methacrylate.

(B) Water-Repelling Agent

The water-repelling agent of component (B) serves to enhance water-repellency.

Examples of the water-repelling agent include a wax water-repelling agent such as a paraffin wax, a polyethylene wax, or an acrylate-ethylene copolymer wax; a silicone water-repelling agent such as a silicon oil, a silicon resin, a polydimethylsiloxane, or an alkylalkoxysilane; and a fluorine-containing water-repelling agent such as a fluoropolyether water-repelling agent or a fluoropolyalkyl water-repelling agent. As the water-repelling agent of component (B), these compounds can be used singly or in a mixture of two or more kinds thereof.

Among these compounds, a fluoropolyether water-repelling agent is preferable as the water-repelling agent of component (B) from a viewpoint of water-repellency. A water-repelling agent including a compound having a (meth)acryloyl group and a fluoropolyether group in a molecule (hereinafter, abbreviated as a (meth)acryloyl group-containing fluoropolyether water-repelling agent) is more preferable as the water-repelling agent of component (B) from a viewpoint of preventing a trouble such as bleed-out of component (B) because of a chemical bond or a strong interaction between the (A) polyfunctional (meth)acrylate of component and component (B). An admixture of an acryloyl group-containing fluoropolyether water-repelling agent and a methacryloyl group-containing fluoropolyether water-repelling agent is still more preferable as the water-repelling agent of component (B) from a viewpoint of appropriately controlling a chemical bond or an interaction between the polyfunctional (meth)acrylate of component (A) and the water-repelling agent of component (B) to exhibit good water-repellency while keeping high transparency.

It should be noted that the (meth)acryloyl group-containing fluoropolyether water-repelling agent is clearly distinguished from component (A) in that the former contains a fluoropolyether group in a molecule. Here, a compound having two or more (meth)acryloyl groups and a fluoropolyether group in one molecule is a (meth)acryloyl group-containing fluoropolyether water-repelling agent, which is component (B). That is, a compound having a fluoropolyether group is excluded from definition of the polyfunctional (meth)acrylate of component (A).

The blending amount of the water-repelling agent of component (B) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of component (B). At the same time, the blending amount of the water-repelling agent of component (B) is usually 0.01 part by mass or more, preferably 0.05 parts by mass or more, and more preferably 0.1 part by mass or more from a viewpoint of obtaining an effect of use of the water-repelling agent of component (B). The blending amount of the water-repelling agent may be usually 0.01 part by mass or more and 7 parts by mass or less, preferably 0.01 part by mass or more and 4 parts by mass or less, or 0.01 part by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 part by mass or more and 7 parts by mass or less, 0.1 part by mass or more and 4 parts by mass or less, or 0.1 part by mass or more and 2 parts by mass or less relative to 100 parts by mass of the polyfunctional (meth)acrylate of component (A).

(C) Silane Coupling Agent

Component (C) serves to enhance adhesiveness between the first hard coat and the second hard coat.

The silane coupling agent is a silane compound having at least two kinds of different reactive groups selected from a hydrolyzable group (for example, an alkoxy group such as a methoxy group or an ethoxy group; an acyloxy group such as an acetoxy group; or a halogen group such as a chloro group) and an organic functional group (for example, an amino group, a mercapto group, a vinyl group, an epoxy group, a methacryloxy group, an acryloxy group, or an isocyanate group). Among these compounds, a silane coupling agent having an amino group (i.e. a silane compound having an amino group and a hydrolyzable group) and a silane coupling agent having a mercapto group (i.e. a silane compound having a mercapto group and a hydrolyzable group) are preferable as the silane coupling agent of component (C) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

As the silane coupling agent of component (C), these compounds can be used singly or in a mixture of two or more kinds thereof.

The blending amount of the silane coupling agent of component (C) is usually 0.01 part by mass or more, preferably 0.05 parts by mass or more, and more preferably 0.1 part by mass or more relative to 100 parts by mass of the polyfunctional (meth)acrylate of component (A) from a viewpoint of obtaining an adhesiveness-enhancing effect reliably. At the same time, the blending amount of the silane coupling agent of component (C) may be usually 10 parts by mass or less, preferably 5 parts by mass or less, and more preferably 1 part by mass or less from a viewpoint of a pot life of a coating material. The blending amount of the silane coupling agent may be usually 0.01 part by mass or more and 10 parts by mass or less, preferably 0.01 part by mass or more and 5 parts by mass or less, or 0.01 part by mass or more and 1 part by mass or less, preferably 0.05 parts by mass or more and 10 parts by mass or less, 0.05 parts by mass or more and 5 parts by mass or less, or 0.05 parts by mass or more and 1 part by mass or less, or preferably 0.1 part by mass or more and 10 parts by mass or less, 0.1 part by mass or more and 5 parts by mass or less, or 0.1 part by mass or more and 1 part by mass or less relative to 100 parts by mass of the polyfunctional (meth)acrylate of component (A).

It should be noted that the blending amount of the silane coupling agent of component (C) in any usual or preferable range referred to herein can be combined with the blending amount of the water-repelling agent of component (B) in any usual or preferable range referred to above.

(F) Resin Fine Particles Having an Average Particle Size of 0.5 to 10 μm

When an anti-glare property is imparted to the molded body according to at least one embodiment, the first hard coat forming coating material can further include (F) resin fine particles having an average particle size of 0.5 to 10 μm. The resin fine particles of component (F) can strongly interact with a resin component such as the polyfunctional (meth)acrylate of component (A).

Examples of the resin fine particles include resin fine particles of a silicon-based resin (silicone resin), a styrene resin, an acrylic resin, a fluorine resin, a polycarbonate resin, an ethylene resin, and a cured resin of an amino compound and formaldehyde. Among these compounds, fine particles of a silicon-based resin, an acrylic resin, and a fluorine resin are preferable from a viewpoint of low specific gravity, lubricity, dispersibility, and solvent resistance. Truly spherical fine particles are preferable from a viewpoint of improving light diffusibility. As the resin fine particles, these particles can be used singly or in a mixture of two or more kinds thereof. The resin fine particles may be at least one selected from the group consisting of silicon-based resin fine particles, acrylic resin fine particles, and fluorine resin fine particles. In addition, the resin fine particles may be at least one selected from the group consisting of silicon-based resin fine particles and acrylic resin fine particles.

The average particle size of the resin fine particles of component (F) may be usually 0.5 μm or more, and preferably 1 μm or more from a viewpoint of obtaining an anti-glare property reliably. On the other hand, when it is intended to retain transparency of a hard coat, the average particle size of the resin fine particles of component (F) may be usually 10 μm or less, and preferably 6 μm or less. The average particle size of the resin fine particles of component (F) may be usually 0.5 μm or more and 10 μm or less, and preferably 0.5 μm or more and 6 μm or less, 1 μm or more and 10 μm or less, or 1 μm or more and 6 μm or less.

Incidentally, here, the average particle size of the resin fine particles is a particle size at which cumulation from a smaller side of the particle size becomes 50% by mass in a particle size distribution curve measured using a laser diffraction/scattering particle size analyzer "MT3200II" (trade name) available from Nikkiso Co., Ltd.

The resin fine particles of component (F) are preferably spherical, and more preferably truly spherical from a viewpoint of improving light diffusibility. The fact that the resin fine particles of component (F) are truly spherical means that the sphericity of the particles may be preferably 0.90 or more, and more preferably 0.95 or more. The sphericity is a measure for indicating how spherical particles are. The sphericity referred to herein is obtained by dividing a surface area of a sphere having the same volume as a particle by a surface area of the particle, and can be represented by $\psi=(6Vp)^{2/3}\pi^{1/3}/Ap$. Here, Vp represents a particle volume, and Ap represents a particle surface area. The sphericity is 1 for a spherical particle.

The blending amount of the resin fine particles of component (F) may be usually from 0.01 to 15 parts by mass, preferably from 0.1 to 10 parts by mass, more preferably from 0.2 to 5 parts by mass, and still more preferably from 0.3 to 3 parts by mass relative to 100 parts by mass of the polyfunctional (meth)acrylate of component (A), although depending on the level of an anti-glare property to be imparted. The blending amount of the resin fine particles of component (F) may be preferably from 0.5 to 3 parts by mass from a viewpoint of abrasion resistance. According to another aspect, the blending amount of the resin fine particles of component (F) may be preferably from 0.01 to 10 parts by mass, from 0.01 to 5 parts by mass, from 0.01 to 3 parts by mass, from 0.1 to 15 parts by mass, from 0.1 to 5 parts by mass, from 0.1 to 3 parts by mass, from 0.2 to 15 parts by mass, from 0.2 to 10 parts by mass, from 0.2 to 3 parts by mass, from 0.3 to 15 parts by mass, from 0.3 to 10 parts by mass, from 0.3 to 5 parts by mass, from 0.5 to 15 parts by mass, from 0.5 to 10 parts by mass, or from 0.5 to 5 parts by mass relative to 100 parts by mass of component (A).

The first hard coat forming coating material preferably further includes a compound having two or more isocyanate groups (—N=C=O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as blocked isocyanates of the polyisocyanates. As the compound having two or more isocyanate groups in one molecule, these compounds can be used singly or in a mixture of two or more kinds thereof. In crosslinking, a catalyst such as dibutyltin dilaurate or dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin compound such as benzoin, benzoin methyl ether, benzoin ethyl ether, benzoin isopropyl ether, or benzyl methyl ketal; an acetophenone compound such as acetophenone, 2,2-dimethoxy-2-phenylacetophenone, or 1-hydroxycyclohexyl phenyl ketone; an anthraquinone compound such as methylanthraquinone, 2-ethylanthraquinone, or 2-amylanthraquinone; a thioxanthone compound such as thioxanthone, 2,4-diethylthioxanthone, or 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. As the photopolymerization initiator, these compounds can be used singly or in a mixture of two or more kinds thereof.

The first hard coat forming coating material can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic fine particles, and an organic colorant, as desired.

The first hard coat forming coating material may include a solvent as desired for dilution to a concentration which allows easy application. The solvent is not particularly limited as long as the solvent neither reacts with any of components (A) to (C) and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these compounds can be used singly or in a mixture of two or more kinds thereof.

The first hard coat forming coating material can be obtained by mixing and stirring these components.

A method for forming the first hard coat using the first hard coat forming coating material is not particularly limited, but a known applying method can be used. Examples of this applying method include dip coating, spray coating, spin coating, and air knife coating. Application is not limited to once, but may be repeated twice or more. Furthermore, when the hard coat forming portion of the molded body according to at least one embodiment is planar, a method such as roll coating, gravure coating, reverse coating, or die coating may be applied.

The thickness of the first hard coat is preferably 0.5 µm or more, and more preferably 1 µm or more from a viewpoint of abrasion resistance and hardness. At the same time, the thickness of the first hard coat is preferably 5 µm or less, more preferably 4 µm or less, and still more preferably 3 µm or less from a viewpoint of hardness and adhesiveness to the second hard coat. The thickness of the first hard coat may be preferably 0.5 µm or more and 5 µm or less, and more preferably 0.5 µm or more and 4 µm or less, 0.5 µm or more and 3 µm or less, 1 µm or more and 5 µm or less, 1 µm or more and 4 µm or less, or 1 µm or more and 3 µm or less.

2-2. Second Hard Coat

The second hard coat is formed of a coating material containing inorganic particles. The second hard coat is preferably formed of a coating material including (A) 100 parts by mass of a polyfunctional (meth)acrylate; and (E) 50 to 300 parts by mass of inorganic fine particles having an average particle size of 1 to 300 nm.

The (A) polyfunctional (meth)acrylate is as described above in the description of the first hard coat forming coating material. As component (A), these compounds can be used singly or in a mixture of two or more kinds thereof.

(D) Inorganic Fine Particles Having an Average Particle Size of 1 to 300 nm

The inorganic fine particles of component (D) serve to dramatically enhance surface hardness of the molded body according to at least one embodiment.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide, or the like; metal fluoride fine particles formed of magnesium fluoride, sodium fluoride, or the like; metal sulfide fine particles; metal nitride fine particles; and metal fine particles.

Among these compounds, fine particles formed of silica or aluminum oxide are preferable, and fine particles formed of silica are more preferable in order to obtain a hard coat having higher surface hardness. Examples of commercially available silica fine particles include Snowtex (trade name) available from Nissan Chemical Industries, Ltd. and Quartron (trade name) available from Fuso Chemical Co., Ltd.

In order to enhance dispersibility of inorganic fine particles in a coating material or enhance surface hardness of a hard coat obtained, it is preferable to use inorganic fine particles which have been subjected to a surface treatment with a silane coupling agent such as a vinylsilane or an aminosilane; a titanate coupling agent; an aluminate coupling agent; an organic compound having a reactive functional group such as an ethylenically unsaturated bond group such as a (meth)acryloyl group, a vinyl group, or an allyl group, or an epoxy group; a surface-treatment agent such as a fatty acid or a fatty acid metal salt; or the like.

As the inorganic fine particles of component (D), these compounds can be used singly or in a mixture of two or more kinds thereof.

The average particle size of the inorganic fine particles of component (D) is 300 nm or less, preferably 200 nm or less, and more preferably 120 nm or less from a viewpoint of obtaining a hardness-improving effect of a hard coat reliably. On the other hand, the lower limit of the average particle size is not particularly specified, but the average particle size of inorganic fine particles usually available is about 1 nm at the finest.

Incidentally, here, the average particle size of the inorganic fine particles is a particle size at which cumulation from a smaller side of the particle size becomes 50% by mass in a particle size distribution curve measured using a laser diffraction/scattering particle size analyzer "MT3200II" (trade name) available from Nikkiso Co., Ltd.

The blending amount of the inorganic fine particles of component (D) is usually 50 parts by mass or more, and preferably 80 parts by mass or more relative to 100 parts by mass of the (A) polyfunctional (meth)acrylate of component from a viewpoint of surface hardness. At the same time, the blending amount of the inorganic fine particles of component (D) is usually 300 parts by mass or less, preferably 200 parts by mass or less, and more preferably 160 part by mass or less from a viewpoint of transparency. The blending amount of the inorganic fine particles may be usually 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, 80 parts by mass or more and 200 parts by mass or less, or 80 parts by mass or more and 160 parts by mass or less relative to 100 parts by mass of the polyfunctional (meth)acrylate of component (A).

(E) Leveling Agent

The second hard coat forming coating material preferably further includes (E) a leveling agent from a viewpoint of improving the second hard coat surface to allow the first hard coat to be formed easily.

Examples of the (E) leveling agent of component include an acrylic leveling agent, a silicone leveling agent, a fluorine leveling agent, a silicone-acrylate copolymer leveling agent, a fluorine-modified acrylic leveling agent, a fluorine-modified silicone leveling agent, and a leveling agent into which a functional group (for example, an alkoxy group such as a methoxy group or an ethoxy group, an acyloxy group, a halogen group, an amino group, a vinyl group, an epoxy group, a methacryloxy group, an acryloxy group, or an isocyanate group) is introduced. Among these compounds, a silicone-acrylate copolymer leveling agent is preferable as the leveling agent of component (E). As the leveling agent of component (E), these compounds can be used singly or in a mixture of two or more kinds thereof.

The blending amount of the (E) leveling agent of component is usually 0.01 part by mass or more, preferably 0.1 part by mass or more, and more preferably 0.2 parts by mass or more relative to 100 parts by mass of the polyfunctional (meth)acrylate of component (A) from a viewpoint of smoothing the second hard coat surface to allow the first hard coat to be formed easily. At the same time, the blending amount of the leveling agent of component (E) may be usually 1 part by mass or less, preferably 0.6 parts by mass or less, and more preferably 0.4 parts by mass or less from a viewpoint of satisfactorily applying the first hard coat forming coating material on the second hard coat without being repelled. The blending amount of the leveling agent may be usually 0.01 part by mass or more and 1 part by mass or less, preferably 0.01 part by mass or more and 0.6 parts by mass or less, or 0.01 part by mass or more and 0.4 parts by mass or less, preferably 0.1 part by mass or more and 1 part by mass or less, 0.1 part by mass or more and 0.6 parts by mass or less, or 0.1 part by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less relative to 100 parts by mass of the polyfunctional (meth)acrylate of component (A).

It should be noted that the blending amount of the leveling agent of component (E) in any usual or preferable range referred to herein can be combined with the blending amount of the inorganic fine particles of component (D) in any usual or preferable range referred to above.

The second hard coat forming coating material preferably further includes a compound having two or more isocyanate groups (—N=C=O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. As the compound having two or more isocyanate groups in one molecule, these compounds can be used singly or in a mixture of two or more kinds thereof.

As the photopolymerization initiator for the second hard coat, the same compounds as those described above for the first hard coat forming coating material can be used. As the photopolymerization initiator, these compounds can be used singly or in a mixture of two or more kinds thereof.

The second hard coat forming coating material can include one or more additives such as an antistatic agent, a surfactant, a thixotropy-imparting agent, an anti-fouling agent, a printability improver, an antioxidant, a weather resistance stabilizer, a light resistance stabilizer, an ultraviolet absorber, a heat stabilizer, a colorant, and organic fine particles, as desired.

The second hard coat forming coating material may include a solvent as desired for dilution to a concentration which allows easy application. The solvent is not particularly limited as long as the solvent neither reacts with any of components (A) and (D) and other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these compounds, 1-methoxy-2-propanol is preferable. As the solvent, these compounds can be used singly or in a mixture of two or more kinds thereof.

The second hard coat forming coating material can be obtained by mixing and stirring these components.

A method for forming the second hard coat using the second hard coat forming coating material is not particularly limited, but a known applying method can be used. Examples of this applying method include dip coating, spray coating, spin coating, and air knife coating. Application is not limited to once, but may be repeated twice or more. Furthermore, when the hard coat forming portion of the molded body according to at least one embodiment is planar, a method such as roll coating, gravure coating, reverse coating, or die coating may be applied.

The thickness of the second hard coat is preferably 5 µm or more, more preferably 10 µm or more, still more preferably 15 µm or more, and further still more preferably 18 µm or more from a viewpoint of surface hardness. At the same time, the thickness of the second hard coat may be preferably 30 µm or less, more preferably 27 µm or less, and still more preferably 25 µm or less from a viewpoint of impact resistance. The thickness of the second hard coat may be preferably 5 µm or more and 30 µm or less, and more preferably 5 µm or more and 27 µm or less, 5 µm or more and 25 µm or less, 10 µm or more and 30 µm or less, 10 µm or more and 27 µm or less, 10 µm or more and 25 µm or less, 15 µm or more and 30 µm or less, 15 µm or more and 27 µm or less, 15 µm or more and 25 µm or less, 18 µm or more and 30 µm or less, 18 µm or more and 27 µm or less, or 18 µm or more and 25 µm or less.

It should be noted that the thickness of the second hard coat in any preferable range referred to herein can be combined with the thickness of the first hard coat in any preferable range referred to above.

The molded body according to at least one embodiment may include any optional layer(s) other than the first hard coat, the second hard coat, and the substrate. Examples of the optional layer include a hard coat other than the first and second hard coats, a resin layer other than the substrate, an anchor coat, a transparent conductive layer, a high refractive index layer, a low refractive index layer, and a reflection-preventive layer.

3. End Face Cut-Processing

Figure 3:
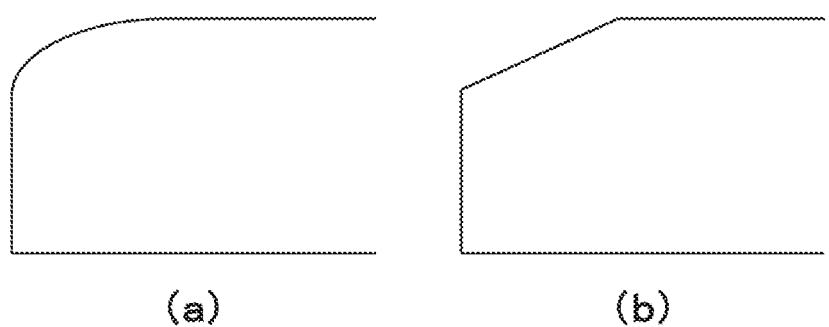
FIG. 3 is a cross-sectional view illustrating an example of end face processing of a molded body.

The molded body according to at least one embodiment may have a shape obtained by subjecting an end face thereof to cut-processing, for example, so-called R-plane cut-processing (FIG. 3(a)) or so-called C-plane cut-processing (FIG. 3(b)), and chamfering the end portion. Examples of a method for producing the molded body having the shape in which an end portion thereof is chamfered include a method for subjecting an end portion of the substrate to cut-processing first, subsequently forming a second hard coat on a surface of the substrate the end portion of which has been subjected to cut-processing, and subsequently forming a first hard coat on a surface of the second hard coat formed; a method for forming a second hard coat on a surface of the substrate first, subsequently subjecting an end portion of the resulting body with the second hard to cut-processing, and subsequently forming a first hard coat on a surface of the resulting cut-processed body; and a method for forming a second hard coat on a surface of the substrate first, subsequently forming a first hard coat on a surface of the second hard coat formed, and subsequently subjecting an end portion of the resulting formed body to cut-processing. In an embodiment of the third method, after the end portion of the formed body is subjected to cut-processing, a coat may be further formed on the cut-processed surface using an optional coating material by a process such as dip coating. The first hard coat forming a surface of the molded body according to at least one embodiment usually has good water-repellency. Therefore, it is easy to form the coat only on the cut-processed surface. That is, even when dip coating is performed using the optional coating material without particularly masking or the like after the end portion of the molded body is subjected to cut-processing, it can be expected that the coat is formed only on the cut-processed surface. Examples of the optional coating material include the first hard coat forming coating material and the second hard coat forming coating material as mentioned above, but are not limited thereto.

4. Article Including the Molded Body According to at Least One Embodiment and Preferable Physical Properties of the Molded Body An article including the molded body according to at least one embodiment is not particularly limited, but examples thereof include a housing of a household electric appliance such as a television, a refrigerator, a washing machine, a vacuum cleaner, a microwave oven, or an air conditioner; a front panel of a door body for opening and closing a front portion of a main body of an article such as a refrigerator, a washing machine, a cupboard, or a wardrobe, and a flat panel of a lid body for opening and closing a flat portion of the main body; a housing of an information electronic device such as a smartphone, a tablet terminal, a car navigation system, a digital camera, or a personal computer, and a curved display face plate; and an instrument panel and a shift knob of an automobile.

When the molded body according to at least one embodiment is used for an application requiring transparency, such as a curved display face plate such as a smart phone, a tablet terminal, a car navigation system, or a personal computer, the total light transmittance (measured with a turbidimeter "NDH 2000" (trade name) available from Nippon Denshoku Industries Co., Ltd. according to JIS K7361-1:1997) of the molded body according to at least one embodiment is preferably 85% or more, more preferably 88% or more, still more preferably 89% or more, and most preferably 90% or more. Due to the total light transmittance of 85% or more, the molded body according to at least one embodiment can be suitably used as a curved display face plate or the like. A higher total light transmittance is more preferable.

In the molded body according to at least one embodiment, the first hard coat surface has a pencil hardness (measured with a pencil "UNI" (trade name) available from Mitsubishi Pencil Co., Ltd. under a condition of a load of 750 g according to JIS K5600-5-4) of preferably 5H or more, more preferably 6H or more, still more preferably 7H or more. A higher pencil hardness is more preferable.

The molded body according to at least one embodiment preferably has a total light transmittance of 85% or more and a pencil hardness of 5H or more on the first hard coat surface. In addition, the molded body according to at least one embodiment preferably has a total light transmittance of 88% or more and a pencil hardness of 5H or more on the first hard coat surface, a total light transmittance of 89% or more and a pencil hardness of 5H or more on the first hard coat surface, a total light transmittance of 90% or more and a pencil hardness of 5H or more on the first hard coat surface, a total light transmittance of 85% or more and a pencil hardness of 6H or more on the first hard coat surface, a total light transmittance of 88% or more and a pencil hardness of 6H or more on the first hard coat surface, a total light transmittance of 89% or more and a pencil hardness of 6H or more on the first hard coat surface, a total light transmittance of 90% or more and a pencil hardness of 6H or more on the first hard coat surface, a total light transmittance of 85% or more and a pencil hardness of 7H or more on the first hard coat surface, a total light transmittance of 88% or more and a pencil hardness of 7H or more on the first hard coat surface, a total light transmittance of 89% or more and a pencil hardness of 7H or more on the first hard coat surface, or a total light transmittance of 90% or more and a pencil hardness of 7H or more on the first hard coat surface.

In the molded body according to at least one embodiment, the first hard coat surface has a water contact angle of preferably 1000 or more, more preferably 1050 or more. Due to the water contact angle of 100° or more at the first hard coat surface, water-repellency, fingerprint resistance, and an antifouling property of the molded body can be improved. The upper limit of the water contact angle is not particularly specified, but about 120° is usually sufficient. Here, the water contact angle is a value measured according to a test (iii) in Examples described below.

In the molded body according to at least one embodiment, the water contact angle at the first hard coat surface after 20,000 reciprocating wipes with a cotton is 100° or more. More preferably, the water contact angle after 25,000 reciprocating wipes with a cotton is 100° or more. Due to the water contact angle of 100° or more after 20,000 reciprocating wipes with a cotton, surface characteristics such as water-repellency, fingerprint resistance, or an antifouling property of the molded body can be maintained even after repeated wipes with a handkerchief or the like. For the number of wipes with a cotton during which a water contact angle of 100° or more can be maintained, a larger number is more preferable. Here, the water contact angle after wipes with a cotton is a value measured according to a test (iv) in Examples described below.

In the molded body according to at least one embodiment, preferably, the water contact angle at the first hard coat surface is 100° or more, and the water contact angle at the first hard coat surface after 20,000 reciprocating wipes with a cotton is 100° or more. Furthermore, in the molded body according to at least one embodiment, preferably, the water contact angle at the first hard coat surface is 105° or more and the water contact angle at the first hard coat surface after 20,000 reciprocating wipes with a cottons is 100° or more, the water contact angle at the first hard coat surface is 100° or more and the water contact angle at the first hard coat surface after 25,000 reciprocating wipes with a cotton is 100° or more, or the water contact angle at the first hard coat surface is 105° or more and the water contact angle at the first hard coat surface after 25,000 reciprocating wipes with a cotton is 100° or more.

It should be noted that the total light transmittance in any preferable range referred to above can be combined with the pencil hardness on the first hard coat surface in any preferable range referred to above, can be combined with the water contact angle at the first hard coat surface referred to herein, and/or can be combined with the water contact angle at the first hard coat surface after 20,000 reciprocating wipes or 25,000 reciprocating wipes with a cotton referred to herein.

EXAMPLES

Hereinafter, the present invention will be described with reference to Examples, but the present invention is not limited thereto.

Measurement and Evaluation Method

In each of the following tests (i) to (ix), a test piece was cut out from a flat portion of a top of a molded body, and physical properties thereof were measured and evaluated, unless otherwise specified.

(i) Total Light Transmittance

The total light transmittance of a test piece was measured according to JIS K7361-1:1997 using a turbidimeter "NDH2000" (trade name) available from Nippon Denshoku Industries Co., Ltd.

(ii) Pencil Hardness

The pencil hardness on a first hard coat surface of a molded body was measured according to JIS K5600-5-4 using a pencil "UNI" (trade name) available from Mitsubishi Pencil Co., Ltd under a condition of a load of 750 g.

(iii) Water Contact Angle (Initial Water Contact Angle)

The water contact angle at a first hard coating surface of a molded body was measured by a method for calculating the water contact angle from a width and a height of a water droplet (see JIS R3257:1999) using an automatic contact angle meter "DSA20" (trade name) available from KRUSS GmbH.

(iv) Abrasion Resistance 1 (Water Contact Angle after Wipes with Cotton)

A test piece was taken from a flat portion of a top of a molded body such that the size thereof was 150 mm in length and 50 mm in width. This test piece was placed on a Gakushin tester according to JIS L0849:2013 such that a first hard coat thereof was a front side. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze. The first hard coating surface of the test piece was rubbed reciprocatingly 10,000 times under conditions of a moving distance of the friction terminal of 60 mm and a speed of one reciprocation/sec. Thereafter, the water contact angle of the cotton-wiped portion was measured according to the method of the (iii). When the water contact angle was 100° or more, an operation of additionally performing 5,000 reciprocating rubs and then measuring the water contact angle of the cotton-wiped portion in accordance with the method of the (iii) was repeated, and evaluation was performed according to the following criteria.

A: The water contact angle was 100° or more even after 25,000 reciprocating rubs.

B: The water contact angle was 100° or more after 20,000 reciprocating rubs, but the water contact angle was less than 100° after 25,000 reciprocating rubs.

C: The water contact angle was 100° or more after 15,000 reciprocating rubs, but the water contact angle was less than 100° after 20,000 reciprocating rubs.

D: The water contact angle was 100° or more after 10,000 reciprocating rubs, but the water contact angle was less than 100° after 15,000 reciprocating rubs.

E: The water contact angle was less than 100° after 10,000 reciprocating rubs.

(v) Abrasion Resistance 2 (Steel Wool Resistance)

A test piece taken from a flat portion of a top of a molded body was placed on a Gakushin tester according to JIS L0849:2013 such that a first hard coat thereof was a front side. Subsequently, a steel wool of #0000 was attached to a friction terminal of the Gakushin tester, and a load of 500 g was then placed. A surface of the test piece was rubbed reciprocatingly 100 times, and then the rubbed portion was visually observed. When no scratch was observed, an operation of additionally performing 100 reciprocating rubs and then visually observing the rubbed portion was repeated, and evaluation was performed according to the following criteria.

A: No scratch was observed even after 500 reciprocating rubs.

B: No scratch was observed after 400 reciprocating rubs, but a scratch could be observed after 500 reciprocating rubs.

C: No scratch was observed after 300 reciprocating rubs, but a scratch could be observed after 400 reciprocating rubs.

D: No scratch was observed after 200 reciprocating rubs, but a scratch could be observed after 300 reciprocating rubs.

E: No scratch was observed after 100 reciprocating rubs, but a scratch could be observed after 200 reciprocating rubs.

F: A scratch could be observed after 100 reciprocating rubs.

(vi) Square Lattice Pattern Test (Adhesiveness)

According to JIS K5600-5-6:1999, a square lattice pattern cut consisting of 100 cells (1 cell=1 mm×1 mm) was formed on a molded body from a first hard coat surface side. Thereafter, a tape for an adhesion test was pasted on the square lattice pattern, was rubbed with fingers, and was then peeled off. The criteria for evaluation were in accordance with Table 1 in the above standard of JIS.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various parts of squares were peeled off partially or entirely. A cross-cut area of clearly more than 15% but not more than 35% was affected.

Classification 4: A coat was largely peeled off along edges of the cuts partially or entirely, and/or some parts of squares were peeled off partially or entirely. A cross-cut area of clearly more than 35% but not more than 65% was affected.

Classification 5: A case where the degree of peeling was more than that in Classification 4.

(vii) Weather Resistance

An accelerated weather resistance test of 300 hours was performed using a sunshine carbon arc lamp type weather resistance tester prescribed in JIS B7753:2007 under conditions in Table 10 of JIS A5759:2008 (a test piece which had been taken from a molded body such that the size was 125 mm in length and 50 mm in width was used as it was, and the test piece was not pasted on glass). The N number of tests was three. In all the tests, a case where there was no change in appearance such as swelling, cracking, or peeling in a test piece was evaluated as an acceptable product (indicated as ⊚ in Tables), and the other cases were evaluated as an unacceptable product (indicated as X in Tables).

(viii) Haze

The haze of a test piece was measured according to JIS K7136:2000 using a turbidimeter "NDH2000" (trade name) available from Nippon Denshoku Industries Co., Ltd.

(ix) Y value of XYZ colorimetric system based on 2 degree visual field

Using a spectrophotometer "SolidSpec-3700" (trade name) available from Shimadzu Corporation and a reflecting unit "absolute reflectance measuring apparatus incident angle 5°" (trade name), a Y value of an XYZ colorimetric system of a test piece was measured under a condition of 5° specular reflection (a reflecting unit was disposed in front of an integrating sphere) according to a manual of the spectrophotometer.

Raw Materials Used (A) Polyfunctional (meth)acrylate (A-1) Dipentaerythritol hexaacrylate (hexafunctional)

(A-2) Pentaerythritol triacrylate (trifunctional)

(B) Water-repelling agent (B-1) An acryloyl group-containing fluoropolyether water-repelling agent "KY-1203" (trade name) available from Shin-Etsu Chemical Co., Ltd.: solid content 20% by mass (B-2) A methacryloyl group-containing fluoropolyether water-repelling agent "FOMBLIN MT70" (trade name) available from Solvay S.A.: solid content 70% by mass (C) Silane coupling agent (C-1) N-2-(aminoethyl)-3-aminopropylmethyldimethoxysilane "KBM-602" (trade name) available from Shin-Etsu Chemical Co., Ltd.

(C-2) N-2-(aminoethyl)-3-aminopropyltrimethoxysilane "KBM-603" (trade name) available from Shin-Etsu Chemical Co., Ltd.

(C-3) 3-aminopropyltrimethoxysilane "KBM-903" (trade name) available from Shin-Etsu Chemical Co., Ltd.

(C-4) 3-mercaptopropylmethyldimethoxysilane "KBM-802" (trade name) available from Shin-Etsu Chemical Co., Ltd.

(C-5) 3-glycidoxypropyltrimethoxysilane "KBM-403" (trade name) available from Shin-Etsu Chemical Co., Ltd.

(D) Inorganic fine particles having an average particle size of 1 to 300 nm (D-1) Silica fine particles which have been subjected to a surface treatment with a silane coupling agent having a vinyl group, and have an average particle size of 20 nm (E) Leveling agent (E-1) A silicone-acrylate copolymer leveling agent "DISPARLON NSH-8430HF" (trade name) available from Kusumoto Chemicals, Ltd.: solid content 10% by mass (E-2) A silicone-acrylate copolymer leveling agent "BYK-3550" (trade name) available from BYK Japan KK: solid content 52% by mass (E-3) An acrylic polymer leveling agent "BYK-399" (trade name) available from BYK Japan KK: solid content 100% by mass (E-4) A silicone leveling agent "DISPARLON LS-480" (trade name) available from Kusumoto Chemicals, Ltd.: solid content 100% by mass (F) Resin fine particles having an average particle size of 0.5 to 10 μm (F-1) Truly spherical silicone resin fine particles "Tospearl 120" (trade name) available from Momentive Performance Materials Corporation: average particle size 2 μm (F-2) Truly spherical silicone resin fine particles "Tospearl 130" (trade name) available from Momentive Performance Materials Corporation: average particle size 3 μm (F-3) Acrylic resin fine particles "MA-180TA" (trade name) available from Soken Chemical & Engineering Co., Ltd.: average particle size 1.8 μm (F-4) Acrylic resin fine particles "MX-80H3wT" (trade name) available from Soken Chemical & Engineering Co., Ltd.: average particle size 0.5 μm (F-5) Acrylic resin fine particles "FH-S010" (trade name) available from Toyobo Co., Ltd.: average particle size 10 μm (G) Optional component (G-1) A phenyl ketone photopolymerization initiator (1-hydroxycyclohexyl phenyl ketone) "SB-PI714" (trade name) available from Shuang Bang Industrial Corp.

(G-2) 1-Methoxy-2-propanol (H1) First hard coat forming coating material (H1-1) A coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (F-1), and 100 parts by mass of the (F-2). Table 1 is a table listing components and their blending amounts. As far as the (B-1) and the (B-2) are concerned, Table 1 shows values in terms of solid content.

(H1-2 to H1-26) First hard coat forming coating materials were obtained in a similar manner to the (H1-1) except that the components and blending amounts thereof were changed as shown in any one of Tables 1 to 3.

TABLE 1

| Component (part by mass) | First hard coat forming coating material | | | | | | | | |
|---|---|---|---|---|---|---|---|---|---|
| | H1-1 | H1-2 | H1-3 | H1-4 | H1-5 | H1-6 | H1-7 | H1-8 | H1-9 |
| A-1 | 100 | 100 | 100 | 100 | 100 | 100 | 100 | 100 | 100 |
| B-1 | 0.40 | 0.080 | 0.80 | 2.0 | — | 8.0 | 0.40 | 0.40 | 0.40 |
| B-2 | 0.042 | 0.0084 | 0.084 | 0.21 | — | 0.84 | 0.042 | 0.042 | 0.042 |
| C-1 | 0.5 | 0.5 | 0.5 | 0.5 | 0.5 | 0.5 | 0.5 | — | 0.01 |
| C-2 | — | — | — | — | — | — | — | — | — |
| C-3 | — | — | — | — | — | — | — | — | — |
| C-4 | — | — | — | — | — | — | — | — | — |
| C-5 | — | — | — | — | — | — | — | — | — |
| D-1 | — | — | — | — | — | — | 2.0 | — | — |
| F-1 | — | — | — | — | — | — | — | — | — |
| F-2 | — | — | — | — | — | — | — | — | — |
| F-3 | — | — | — | — | — | — | — | — | — |
| F-4 | — | — | — | — | — | — | — | — | — |
| F-5 | — | — | — | — | — | — | — | — | — |
| G-1 | 4 | 4 | 4 | 4 | 4 | 4 | 4 | 4 | 4 |
| G-2 | 100 | 100 | 100 | 100 | 100 | 80 | 130 | 100 | 100 |

TABLE 2

| Component (part by mass) | First hard coat forming coating material | | | | | | | | |
|---|---|---|---|---|---|---|---|---|---|
| | H1-10 | H1-11 | H1-12 | H1-13 | H1-14 | H1-15 | H1-16 | H1-17 | H1-18 |
| A-1 | 100 | 100 | 100 | 100 | 100 | 100 | 100 | 100 | 100 |
| B-1 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 |
| C-1 | 0.1 | 1 | 5 | — | — | — | — | 0.5 | 0.5 |
| C-2 | — | — | — | 0.5 | — | — | — | — | — |
| C-3 | — | — | — | — | 0.5 | — | — | — | — |
| C-4 | — | — | — | — | — | 0.5 | — | — | — |
| C-5 | — | — | — | — | — | — | 0.5 | — | — |
| D-1 | — | — | — | — | — | — | — | — | — |
| F-1 | — | — | — | — | — | — | — | 0.4 | 0.9 |
| F-2 | — | — | — | — | — | — | — | — | — |
| F-3 | — | — | — | — | — | — | — | — | — |
| F-4 | — | — | — | — | — | — | — | — | — |
| F-5 | — | — | — | — | — | — | — | — | — |
| G-1 | 4 | 4 | 4 | 4 | 4 | 4 | 4 | 4 | 4 |
| G-2 | 100 | 100 | 105 | 100 | 100 | 100 | 100 | 100 | 100 |

TABLE 3

| Component (part by mass) | First hard coat forming coating material | | | | | | | |
|---|---|---|---|---|---|---|---|---|
| | H1-19 | H1-20 | H1-21 | H1-22 | H1-23 | H1-24 | H1-25 | H1-26 |
| A-1 | 100 | 100 | 100 | 100 | 100 | 100 | 100 | 100 |
| B-1 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 |
| C-1 | 0.5 | 0.5 | 0.5 | 0.5 | 0.5 | 0.5 | 0.5 | 0.5 |
| C-2 | — | — | — | — | — | — | — | — |
| C-3 | — | — | — | — | — | — | — | — |
| C-4 | — | — | — | — | — | — | — | — |
| C-5 | — | — | — | — | — | — | — | — |
| D-1 | — | — | — | — | — | — | — | — |
| F-1 | 2 | 4 | 8 | 15 | — | — | — | — |
| F-2 | — | — | — | — | 2 | — | — | — |
| F-3 | — | — | — | — | — | 2 | — | — |
| F-4 | — | — | — | — | — | — | 2 | — |
| F-5 | — | — | — | — | — | — | — | 2 |
| G-1 | 4 | 4 | 4 | 4 | 4 | 4 | 4 | 4 |
| G-2 | 100 | 100 | 100 | 100 | 100 | 100 | 100 | 100 |

(H2) Second hard coat forming coating material (H2-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1), and 200 parts by mass of the (F-2). Table 4 is a table listing components and their blending amounts. As far as the (E-1) is concerned, Table 4 shows a value in terms of solid content.

(H2-2 to H2-15) A second hard coat forming coating material was obtained in a similar manner to the (H2-1) except that the components and blending amounts thereof were changed as shown in Table 4 or 5. As far as the (E-2) as well as the (E-1) is concerned, Table 4 or 5 also shows values in terms of solid content.

TABLE 4

| Blending amount (part by mass) | Second hard coat forming coating material | | | | | | |
|---|---|---|---|---|---|---|---|
| | H2-1 | H2-2 | H2-3 | H2-4 | H2-5 | H2-6 | H2-7 |
| A-2 | 100 | 100 | 100 | 100 | 100 | 100 | 100 |
| D-1 | 140 | 140 | 140 | 140 | 140 | 140 | — |
| E-1 | 0.2 | — | 0.1 | 0.4 | 0.6 | 1.5 | — |
| E-2 | — | — | — | — | — | — | 0.2 |
| E-3 | — | — | — | — | — | — | — |
| E-4 | — | — | — | — | — | — | — |
| G-1 | 17 | 17 | 17 | 17 | 17 | 17 | 17 |
| G-2 | 200 | 200 | 200 | 200 | 200 | 200 | 200 |

TABLE 5

| Blending amount (part by mass) | Second hard coat forming coating material | | | | | | | |
|---|---|---|---|---|---|---|---|---|
| | H2-8 | H2-9 | H2-10 | H2-11 | H2-12 | H2-13 | H2-14 | H2-15 |
| A-2 | 100 | 100 | 100 | 100 | 100 | 100 | 100 | 100 |
| D-1 | 140 | 140 | 140 | 80 | 200 | 30 | 400 | — |
| E-1 | — | — | — | 0.2 | 0.2 | 0.2 | 0.2 | 0.2 |
| E-2 | 0.4 | — | — | — | — | — | — | — |
| E-3 | — | 0.3 | — | — | — | — | — | — |
| E-4 | — | — | 0.3 | — | — | — | — | — |
| G-1 | 17 | 17 | 17 | 17 | 17 | 17 | 17 | 17 |
| G-2 | 200 | 200 | 200 | 155 | 250 | 120 | 420 | 120 |

Figure 4:
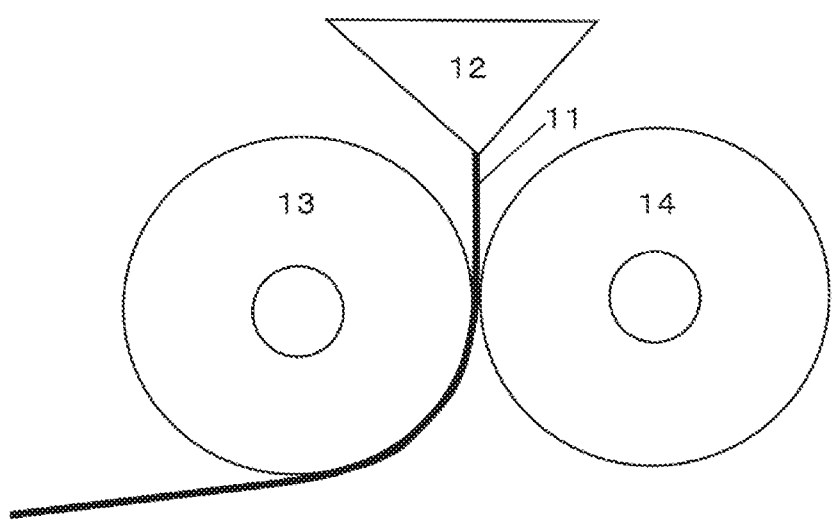
FIG. 4 is a conceptual diagram of an apparatus used for manufacturing a resin sheet in Examples.

(a) Substrate (a1-1) Substrate 1 Formed by Subjecting an Acrylic Resin Sheet to Vacuum Forming Using an apparatus equipped with an extruder and a T-die 12, a melted sheet 11 of an acrylic resin "Optimas 6000" (trade name) (having a glass transition temperature of 119° C.) available from Mitsubishi Gas Chemical Co., Ltd. was continuously extruded from the T-die 12, and the melted sheet 11 was supplied and introduced between a rotating first mirror-finished roll 13 (i.e. a roll to hold a melted sheet and send the melted sheet to a subsequent transfer roll, this also applies to the following) and a rotating second mirror-finished roll 14, and was pressed to obtain a transparent resin sheet having a thickness of 1 mm (see FIG. 4). As setting conditions at this time, a set temperature of the first mirror-finished roll 13 was 120° C., a set temperature of the second mirror-finished roll 14 was 110° C., and a resin temperature at an outlet of the T-die 12 was 300° C. The obtained resin sheet had a total light transmittance of 92%, a haze of 0.5%, a yellowness index of 0.3, and a tensile elastic modulus of 3400 MPa. Subsequently, using the obtained resin sheet, a substrate having a shape illustrated in FIG. 1 was molded as described above using a vacuum forming process. At this time, the pressure in the space 9 was $1.0 \times 10^{-3}$ kPa. FIG. 1(a) is a plan view, and FIG. 1(b) is a side view. In a substrate shown in FIG. 1, a length 1 of a long axis at a top flat portion having an elliptical shape was 20 cm, a length 2 of a long axis at an end portion having an elliptical shape was 30 cm, a length 3 of a short axis at a top flat portion having an elliptical shape was 10 cm, a length 4 of a short axis at an end portion having an elliptical shape was 20 cm, and a height 5 from the end portion to the top portion was 5 cm.

(a1-2) Substrate 2 Formed by Subjecting an Acrylic Resin Sheet to Vacuum Molding Using an apparatus equipped with an extruder and the T-die 12, a melted sheet 11 of a poly(meth)acrylimide resin "PLEXIMID TT50" (trade name) (having a glass transition temperature of 154° C.) available from Evonik Industries AG was continuously extruded from the T-die 12, and the melted sheet 11 was supplied and introduced between the rotating first mirror-finished roll 13 and the rotating second mirror-finished roll 14, and was pressed to obtain a transparent resin sheet having a thickness of 1 mm (see FIG. 4). As setting conditions at this time, a set temperature of the first mirror-finished roll 13 was 140° C., a set temperature of the second mirror-finished roll 14 was 120° C., and a resin temperature at an outlet of the T-die 12 was 300° C. The obtained transparent resin sheet had a total light transmittance of 92%, a haze of 0.5%, a yellowness index of 0.3, and a tensile elastic modulus of 4300 MPa. Subsequently, using the obtained resin sheet, a substrate having a shape illustrated in FIG. 1 was molded as described above using a vacuum forming process. At this time, the pressure in the space 9 was $1.0 \times 10^{-3}$ kPa.

(a2-1) Aromatic Polycarbonate Resin Sheet

Using an apparatus equipped with an extruder and the T-die 12, a melted sheet 11 of an aromatic polycarbonate "CALIBRE 301-4" (trade name) (having a glass transition temperature of 151° C.) available from Sumika Styron Polycarbonate Limited was continuously extruded from the T-die 12, and the melted sheet was supplied and introduced between the rotating first mirror-finished roll 13 and the rotating second mirror-finished roll 14, and was pressed to obtain a transparent resin sheet having a thickness of 1 mm (see FIG. 4). As setting conditions at this time, a set temperature of the first mirror-finished roll 13 was 140° C., a set temperature of the second mirror-finished roll 14 was 120° C., and a resin temperature at an outlet of the T-die 12 was 300° C. The obtained transparent resin sheet had a total light transmittance of 90%, a haze of 0.6%, a yellowness index of 0.5, and a tensile elastic modulus of 2300 MPa. Subsequently, using the obtained resin sheet, a substrate having a shape illustrated in FIG. 1 was molded as described above using a vacuum forming process. At this time, the pressure in the space 9 was $1.0 \times 10^{-3}$ kPa.

(a3-1) Polyester Resin Sheet 1

Using an apparatus equipped with an extruder and the T-die 12, a melted sheet 11 of an amorphous polyester resin (PETG resin) "Cadence GS 1" (trade name) (having a glass transition temperature of 81° C.) available from Eastman Chemical Company was continuously extruded from the T-die 12, and the melted sheet 11 was supplied and introduced between the rotating first mirror-finished roll 13 and the rotating second mirror-finished roll 14, and was pressed to obtain a transparent resin sheet having a thickness of 1 mm (see FIG. 4). As setting conditions at this time, a set temperature of the first mirror-finished roll 13 was 80° C., a set temperature of the second mirror-finished roll 14 was 40° C., and a resin temperature at an outlet of the T-die 12 was 200° C. The obtained transparent resin sheet had a total light transmittance of 89%, a haze of 1.3%, a yellowness index of 0.4, and a tensile elastic modulus of 1500 MPa. Subsequently, using the obtained resin sheet, a substrate having a shape illustrated in FIG. 1 was molded as described above using a vacuum forming process. At this time, the pressure in the space 9 was $1.0 \times 10^{-3}$ KPa.

(a3-2) Polyester Resin Sheet 2

Using an apparatus equipped with an extruder and the T-die 12, a melted sheet 11 of an amorphous polyester resin "Tritan FX200" (trade name) (having a glass transition temperature of 119° C.) available from Eastman Chemical Company was continuously extruded from the T-die 12, and the melted sheet 11 was supplied and introduced between the rotating first mirror-finished roll 13 and the rotating second mirror-finished roll 14, and was pressed to obtain a transparent resin sheet having a thickness of 1 mm (see FIG. 4). As setting conditions at this time, a set temperature of the first mirror-finished roll 13 was 80° C., a set temperature of the second mirror-finished roll 14 was 40° C., and a resin temperature at an outlet of the T-die 12 was 230° C. The obtained transparent resin sheet had a total light transmittance of 90%, a haze of 1.2%, a yellowness index of 0.4, and a tensile elastic modulus of 1500 MPa. Subsequently, using the obtained resin sheet, a substrate having a shape illustrated in FIG. 1 was molded as described above using a vacuum forming process. At this time, the pressure in the space 9 was $1.0 \times 10^{-3}$ KPa.

(a4-1) Laminated Sheet 1

Using a two-kind/three-layer multimanifold-type co-extrusion film forming apparatus equipped with an extruder and a T-die, a melted laminated sheet in which both outer layers were formed of an acrylic resin "Optimas 7500" (trade name) (having a glass transition temperature of 119° C.) available from Mitsubishi Gas Chemical Co., Ltd. and an intermediate layer was formed of an aromatic polycarbonate "CALIBRE 301-4" (trade name) (having a glass transition temperature of 151° C.) available from Sumika Styron Polycarbonate Limited was continuously extruded from the T-die, and the melted laminated sheet was supplied and introduced between a rotating first mirror-finished roll and a rotating second mirror-finished roll, and was pressed to obtain a transparent resin sheet having a total thickness of 1 mm, a thicknesses of each of both the outer layers of 0.1 mm, a thicknesses of an intermediate layer of 0.8 mm. As setting conditions at this time, a set temperature of the first mirror-finished roll was 120° C., a set temperature of the second mirror-finished roll was 110° C., and a resin temperature at an outlet of the T-die was 300° C. The obtained transparent resin sheet had a total light transmittance of 91%, a haze of 0.6%, a yellowness index of 0.5, and a tensile elastic modulus of 2600 MPa. Subsequently, using the obtained resin sheet, a substrate having a shape illustrated in FIG. 1 was molded as described above using a vacuum forming process. At this time, the pressure in the space 9 was $1.0 \times 10^{-3}$ KPa.

(a5-1) Substrate Formed by Injection Molding ABS/PC Alloy Resin

An ABS/PC alloy resin "Exceloy CK50" (trade name) available from Techno Polymer Co., Ltd. was subjected to injection molding using a 100 ton injection molding machine at a cylinder temperature of 260° C. at a die temperature of 70° C. at an injection speed of 250 mm/sec at a holding pressure of 50 MPa to obtain a thermoplastic resin substrate.

Example 1

A hard coat of the (H2-1) was formed on a protruded side surface of the (a1-1) using a dip coating process so as to have a thickness of 22 μm after curing. Subsequently, a hard coat of the (H1-1) was formed on a surface of the formed hard coat using a dip coat process so as to have a thickness of 2 μm after curing. The obtained molded body was subjected to the tests (i) to (ix). Table 6 shows results thereof. Here, "HC" in Table 6 and the following Tables indicates an abbreviation for hard coat

Examples 2 to 16

A molded body was produced, and measurement and evaluation of physical properties thereof were performed in a similar manner to Example 1 except that a first hard coat forming coating material shown in any one of Tables 6 to 8 was used in place of the (H1-1). Tables 6 to 8 each show results thereof.

Examples 17 to 29

A molded body was manufactured, and measurement and evaluation of physical properties thereof were performed in a similar manner to Example 1 except that a second hard coat forming coating material shown in any one of Tables 8 to 10 was used in place of the (H2-1). Tables 8 to 10 each show results thereof.

Examples 30 to 34

A molded body was manufactured, and measurement and evaluation of physical properties thereof were performed in a similar manner to Example 1 except that a substrate shown in Table 10 was used in place of the (a1-1). Table 10 shows results thereof.

Example 35

A molded body was manufactured, and measurement and evaluation of physical properties thereof were performed in a similar manner to Example 1 except that a substrate shown in Table 10, the (a5-1) was used in place of the (a1-1). Table 10 shows results thereof. The (a5-1) is an opaque substrate, and therefore the tests (i) and (xiii) were omitted.

Examples 36 to 39

A molded body was manufactured, and measurement and evaluation of physical properties thereof were performed in a similar manner to Example 1 except that the thickness of the first hard coat after curing was changed as shown in Table 11. Table 11 shows results thereof.

Examples 40 to 43

A molded body was manufactured, and measurement and evaluation of physical properties thereof were performed in a similar manner to Example 1 except that the thickness of the second hard coat after curing was changed as shown in Table 11 or 12. Table 11 or 12 shows results thereof.

Examples 44 to 53

A molded body was manufactured, and measurement and evaluation of physical properties thereof were performed in a similar manner to Example 1 except that a first hard coat forming coating material shown in Table 12 or 13 was used in place of the (H1-1). Table 12 or 13 shows results thereof.

TABLE 6

| | | Example 1 | Example 2 | Example 3 | Example 4 | Example 5 | Example 6 | Example 7 |
|---|---|---|---|---|---|---|---|---|
| Composition | First HC coating material | H1-1 | H1-2 | H1-3 | H1-4 | H1-5 | H1-6 | H1-7 |
| | Thickness of first HC μm | 2 | 2 | 2 | 2 | 2 | 2 | 2 |
| | Second HC coating material | H2-1 | H2-1 | H2-1 | H2-1 | H2-1 | H2-1 | H2-1 |
| | Thickness of second HC μm | 22 | 22 | 22 | 22 | 22 | 22 | 22 |
| | Substrate | a1-1 | a1-1 | a1-1 | a1-1 | a1-1 | a1-1 | a1-1 |
| Evaluation results | Total light transmittance % | 90.4 | 90.4 | 90.3 | 89.9 | 90.4 | 89.3 | 89.6 |
| | Pencil hardness | 7H | 7H | 7H | 7H | 5H | 7H | 7H |
| | Water contact angle deg | 116 | 115 | 116 | 118 | 72.1 | 119 | 116 |
| | Abrasion resistance 1 | A | B | A | A | E | A | E |
| | Abrasion resistance 2 | A | A | A | A | D | A | F |
| | Square lattice pattern test | Classification 0 | Classification 0 | Classification 0 | Classification 0 | Classification 0 | Classification 0 | Classification 0 |
| | Weather resistance | ◎ | ◎ | ◎ | ◎ | ◎ | ◎ | ◎ |
| | Haze % | 0.7 | 0.6 | 0.8 | 1.8 | 0.6 | 4 | 0.8 |
| | Y value of XYZ colorimetric system % | 4.6 | 4.6 | 4.6 | 4.4 | 4.6 | 4.3 | 4.6 |

TABLE 7

|  |  | Example 8 | Example 9 | Example 10 | Example 11 | Example 12 | Example 13 | Example 14 |
|---|---|---|---|---|---|---|---|---|
| Composition | First HC coating material | H1-8 | H1-9 | H1-10 | H1-11 | H1-12 | H1-13 | H1-14 |
|  | Thickness of first HC μm | 2 | 2 | 2 | 2 | 2 | 2 | 2 |
|  | Second HC coating material | H2-1 | H2-1 | H2-1 | H2-1 | H2-1 | H2-1 | H2-1 |
|  | Thickness of second HC μm | 22 | 22 | 22 | 22 | 22 | 22 | 22 |
|  | Substrate | a1-1 | a1-1 | a1-1 | a1-1 | a1-1 | a1-1 | a1-1 |
| Evaluation results | Total light transmittance % | 90.4 | 90.4 | 90.4 | 90.4 | 90.4 | 90.4 | 90.4 |
|  | Pencil hardness | 7H | 7H | 7H | 7H | 7H | 7H | 7H |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Square lattice pattern test | Classification 4 | Classification 1 | Classification 0 | Classification 0 | Classification 0 | Classification 0 | Classification 0 |
|  | Weather resistance | ◎ | ◎ | ◎ | ◎ | ◎ | ◎ | ◎ |
|  | Haze % | 0.7 | 0.7 | 0.7 | 0.7 | 0.7 | 0.7 | 0.7 |
|  | Y value of XYZ colorimetric system % | 4.6 | 4.6 | 4.6 | 4.6 | 4.6 | 4.6 | 4.6 |

TABLE 8

|  |  | Example 15 | Example 16 | Example 17 | Example 18 | Example 19 | Example 20 | Example 21 |
|---|---|---|---|---|---|---|---|---|
| Composition | First HC coating material | H1-15 | H1-16 | H1-1 | H1-1 | H1-1 | H1-1 | H1-1 |
|  | Thickness of first HC μm | 2 | 2 | 2 | 2 | 2 | 2 | 2 |
|  | Second HC coating material | H2-1 | H2-1 | H2-2 | H2-3 | H2-4 | H2-5 | H2-6 |
|  | Thickness of second HC μm | 22 | 22 | 22 | 22 | 22 | 22 | 22 |
|  | Substrate | a1-1 | a1-1 | a1-1 | a1-1 | a1-1 | a1-1 | a1-1 |
| Evaluation results | Total light transmittance % | 90.4 | 90.4 | 90.4 | 90.4 | 90.4 | 90.4 | 90.4 |
|  | Pencil hardness | 7H | 7H | 7H | 7H | 7H | 7H | 7H |
|  | Water contact angle deg | 116 | 116 | 116 | 116 | 116 | 116 | 116 |
|  | Abrasion resistance 1 | A | A | B | A | A | A | A |
|  | Abrasion resistance 2 | A | A | B | A | A | A | A |
|  | Square lattice pattern test | Classification 0 | Classification 3 | Classification 0 | Classification 0 | Classification 0 | Classification 0 | Classification 2 |
|  | Weather resistance | ◎ | ◎ | ◎ | ◎ | ◎ | ◎ | ◎ |
|  | Haze % | 0.7 | 0.7 | 0.8 | 0.7 | 0.7 | 0.7 | 1 |
|  | Y value of XYZ colorimetric system % | 4.6 | 4.6 | 4.5 | 4.6 | 4.6 | 4.6 | 4.5 |

TABLE 9

|  |  | Example 22 | Example 23 | Example 24 | Example 25 | Example 26 | Example 27 | Example 28 | Example 28-2 |
|---|---|---|---|---|---|---|---|---|---|
| Comp. | First HC coating material | H1-1 | H1-1 | H1-1 | H1-1 | H1-1 | H1-1 | H1-1 | H1-1 |
|  | Thickness of first HC μm | 2 | 2 | 2 | 2 | 2 | 2 | 2 | 2 |

TABLE 9-continued

|  |  | Example 22 | Example 23 | Example 24 | Example 25 | Example 26 | Example 27 | Example 28 | Example 28-2 |
|---|---|---|---|---|---|---|---|---|---|
|  | Second HC coating material | H2-7 | H2-8 | H2-9 | H2-10 | H2-11 | H2-12 | H2-13 | H2-15 |
|  | Thickness of second HC μm | 22 | 22 | 22 | 22 | 22 | 22 | 22 | 22 |
|  | Substrate | a1-1 | a1-1 | a1-1 | a1-1 | a1-1 | a1-1 | a1-1 | a1-1 |
| Evaluation results | Total light transmittance % | 90.4 | 90.4 | 90.4 | 90.4 | 90.6 | 89.5 | 90.6 | 91.8 |
|  | Pencil hardness | 7H | 7H | 7H | 7H | 6H | 8H | 3H | H |
|  | Water contact angle deg | 116 | 116 | 116 | 116 | 116 | 116 | 116 | 116 |
|  | Abrasion resistance 1 | A | A | A | A | A | A | A | A |
|  | Abrasion resistance 2 | A | A | A | A | A | A | A | A |
|  | Square lattice pattern test | Class 0 | Class 0 | Class 0 | Class 2 | Class 0 | Class 0 | Class 0 | Class 0 |
|  | Weather resistance | ⊚ | ⊚ | ⊚ | ⊚ | ⊚ | ⊚ | ⊚ | ⊚ |
|  | Haze % | 0.7 | 0.7 | 1 | 1 | 0.7 | 1.1 | 0.6 | 0.5 |
|  | Y value of XYZ colorimetric system % | 4.6 | 4.6 | 4.5 | 4.5 | 4.6 | 4.4 | 4.6 | 4.6 |

TABLE 10

|  |  | Example 29 | Example 30 | Example 31 | Example 32 | Example 33 | Example 34 | Example 35 |
|---|---|---|---|---|---|---|---|---|
| Composition | First HC coating material | H1-1 | H1-1 | H1-1 | H1-1 | H1-1 | H1-1 | H1-1 |
|  | Thickness of first HC μm | 2 | 2 | 2 | 2 | 2 | 2 | 2 |
|  | Second HC coating material | H2-14 | H2-1 | H2-1 | H2-1 | H2-1 | H2-1 | H2-1 |
|  | Thickness of second HC μm | 22 | 22 | 22 | 22 | 22 | 22 | 22 |
|  | Substrate | a1-1 | a1-2 | a2-1 | a3-1 | a3-2 | a4-1 | a5-1 |
| Evaluation results | Total light transmittance % | 87.5 | 90.4 | 90.1 | 89.2 | 89.3 | 90.4 | Omission |
|  | Pencil hardness | 9H | 7H | 2H | H | H | 7H | 2H |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Square lattice pattern test | Classification 0 | Classification 0 | Classification 0 | Classification 0 | Classification 0 | Classification 0 | Classification 0 |
|  | Weather resistance | ⊚ | ⊚ | ⊚ | ⊚ | ⊚ | ⊚ | ⊚ |
|  | Haze % | 4 | 0.7 | 0.8 | 1.2 | 1.1 | 0.7 | Omission |
|  | Y value of XYZ colorimetric system % | 4.2 | 4.6 | 4.6 | 4.5 | 4.5 | 4.6 | 4.6 |

TABLE 11

|  |  | Example 36 | Example 37 | Example 38 | Example 39 | Example 40 | Example 41 |
|---|---|---|---|---|---|---|---|
| Composition | First HC coating material | H1-1 | H1-1 | H1-1 | H1-1 | H1-1 | H1-1 |
|  | Thickness of first HC μm | 0.5 | 1 | 3 | 5 | 2 | 2 |
|  | Second HC coating material | H2-1 | H2-1 | H2-1 | H2-1 | H2-1 | H2-1 |

TABLE 11-continued

|  |  | Example 36 | Example 37 | Example 38 | Example 39 | Example 40 | Example 41 |
|---|---|---|---|---|---|---|---|
|  | Thickness of second HC μm | 22 | 22 | 22 | 22 | 15 | 18 |
|  | Substrate | a1-1 | a1-1 | a1-1 | a1-1 | a1-1 | a1-1 |
| Evaluation results | Total light transmittance % | 90.4 | 90.4 | 90.4 | 90.4 | 90.6 | 90.3 |
|  | Pencil hardness | 5H | 7H | 7H | 7H | 5H | 7H |
|  | Water contact angle deg | 116 | 116 | 116 | 116 | 116 | 116 |
|  | Abrasion resistance 1 | B | A | A | A | A | A |
|  | Abrasion resistance 2 | B | A | A | A | A | A |
|  | Square lattice pattern test | Classification 0 | Classification 0 | Classification 0 | Classification 2 | Classification 0 | Classification 0 |
|  | Weather resistance | ⊚ | ⊚ | ⊚ | ⊚ | ⊚ | ⊚ |
|  | Haze % | 0.7 | 0.7 | 0.9 | 1.4 | 0.7 | 0.7 |
|  | Y value of XYZ colorimetric system % | 4.7 | 4.6 | 4.5 | 4.4 | 4.6 | 4.6 |

TABLE 12

|  |  | Example 42 | Example 43 | Example 44 | Example 45 | Example 46 | Example 47 |
|---|---|---|---|---|---|---|---|
| Composition | First HC coating material | H1-1 | H1-1 | H1-17 | H1-18 | H1-19 | H1-20 |
|  | Thickness of first HC μm | 2 | 2 | 2 | 2 | 2 | 2 |
|  | Second HC coating material | H2-1 | H2-1 | H2-1 | H2-1 | H2-1 | H2-1 |
|  | Thickness of second HC μm | 25 | 35 | 22 | 22 | 22 | 22 |
|  | Substrate | a1-1 | a1-1 | a1-1 | a1-1 | a1-1 | a1-1 |
| Evaluation results | Total light transmittance % | 90.0 | 89.5 | 90.4 | 90.1 | 90.0 | 88.4 |
|  | Pencil hardness | 7H | 9H | 7H | 7H | 7H | 7H |
|  | Water contact angle deg | 116 | 116 | 115 | 113 | 115 | 114 |
|  | Abrasion resistance 1 | A | A | E | C | B | C |
|  | Abrasion resistance 2 | A | A | B | C | C | D |
|  | Square lattice pattern test | Classification 0 | Classification 0 | Classification 0 | Classification 0 | Classification 0 | Classification 0 |
|  | Weather resistance | ⊚ | ⊚ | ⊚ | ⊚ | ⊚ | ⊚ |
|  | Haze % | 0.7 | 0.7 | 1.4 | 3.0 | 7.5 | 14.5 |
|  | Y value of XYZ colorimetric system % | 4.6 | 4.6 | 4.1 | 3.1 | 2.6 | 1.8 |

TABLE 13

|  |  | Example 48 | Example 49 | Example 50 | Example 51 | Example 52 | Example 53 |
|---|---|---|---|---|---|---|---|
| Composition | First HC coating material | H1-21 | H1-22 | H1-23 | H1-24 | H1-25 | H1-26 |
|  | Thickness of first HC μm | 2 | 2 | 2 | 2 | 2 | 2 |
|  | Second HC coating material | H2-1 | H2-1 | H2-1 | H2-1 | H2-1 | H2-1 |
|  | Thickness of second HC μm | 22 | 22 | 22 | 22 | 22 | 22 |
|  | Substrate | a1-1 | a1-1 | a1-1 | a1-1 | a1-1 | a1-1 |
| Evaluation results | Total light transmittance % | 88.1 | 85.1 | 89.5 | 88.5 | 89.9 | 89.7 |
|  | Pencil hardness | 7H | 7H | 7H | 6H | 6H | 5H |
|  | Water contact angle deg | 114 | 111 | 111 | 112 | 114 | 113 |
|  | Abrasion resistance 1 | C | C | D | E | E | E |
|  | Abrasion resistance 2 | E | E | C | C | C | C |
|  | Square lattice pattern test | Classification 0 | Classification 0 | Classification 0 | Classification 0 | Classification 0 | Classification 0 |
|  | Weather resistance | ⊚ | ⊚ | ⊚ | ⊚ | ⊚ | ⊚ |
|  | Haze % | 21.7 | 35.2 | 8.2 | 5.8 | 3.2 | 5.4 |

TABLE 13-continued

|  | Example 48 | Example 49 | Example 50 | Example 51 | Example 52 | Example 53 |
|---|---|---|---|---|---|---|
| Y value of XYZ colorimetric system % | 1.6 | 1.4 | 2.5 | 3.2 | 4.0 | 3.5 |

From these experimental results, it has been found that a preferable molded body according to at least one embodiment has excellent surface hardness and excellent abrasion resistance. In addition, a preferable molded body according to at least one embodiment has good weather resistance and good adhesiveness to a hard coat.

REFERENCE SIGNS LIST

1 Length of a long axis at a top flat portion having an elliptical shape
2 Length of a long axis at an end portion having an elliptical shape
3 Length of a short axis at a top flat portion having an elliptical shape
4 Length of a short axis at an end portion having an elliptical shape
5 Height from an end portion to a top portion
6 Resin sheet
7 Infrared heater
8 Molding die
9 Space between the resin sheet 6 and the molding die 8
10 Substrate
11 Melted resin sheet
12 T-die
13 First mirror-finished roll
14 Second mirror-finished roll

The invention claimed is:

1. A molded body comprising: a resin substrate, wherein the substrate has a three-dimensional shape,
wherein a part or all of a surface of the substrate is coated with a hard coat,
wherein the hard coat comprises, from a surface layer side, a first hard coat layer and a second hard coat layer,
wherein the first hard coat is formed of a coating material comprising:
(A) 100 parts by mass of a polyfunctional (meth) acrylate;
(B) 0.01 to 7 parts by mass of a water-repelling agent; and
(C) 0.01 to 10 parts by mass of a silane coupling agent, and containing no inorganic particles, and
wherein the second hard coat is formed of a coating material comprising:
(A) 100 parts by mass of the polyfunctional (meth) acrylate; and
(D) 50 to 300 parts by mass of inorganic fine particles having an average particle size of 1 to 300 nm.

2. The molded body according to claim 1, wherein the (C) silane coupling agent comprises one or more selected from the group consisting of a silane coupling agent having an amino group and a silane coupling agent having a mercapto group.

3. The molded body according to claim 1, wherein the (B) water-repelling agent comprises a (meth)acryloyl group-containing fluoropolyether water- repelling agent.

4. The molded body according to claim 1, wherein the second hard coat forming coating material further comprises (E) 0.01 to 1 part by mass of a leveling agent.

5. The molded body according to claim 1, wherein the first hard coat forming coating material further comprises (F) 0.1 to 15 parts by mass of resin fine particles having an average particle size of 0.5 to 10 μm.

6. The molded body according to claim 1, wherein the thickness of the first hard coat is from 0.5 to 5 μm.

7. The molded body according to claim 1, wherein the thickness of the second hard coat is from 5 to 30 μm.

8. The molded body according to claim 1, having a shape in which an end portion thereof is chamfered.

9. An article comprising the molded body according to claim 1.

10. A method for producing the molded body according to claim 1, comprising:
a step (1a) of molding a resin sheet three-dimensionally to produce the substrate;
a step (2) of forming the second hard coat on a part or all of a surface of the substrate obtained in the step (1a); and
a step (3) of forming the first hard coat on a surface of the second hard coat formed in the step (2).

11. A method for producing an article comprising a molded body, comprising:
a step of producing the molded body by the method according to claim 10; and
a step (4) of producing the article using the molded body thus obtained.

12. A method for producing the molded body according to claim 1, comprising:
a step (1b) of molding a thermoplastic resin to produce the substrate;
a step (2) of forming the second hard coat on a part or all of a surface of the substrate obtained in the step (1b); and
a step (3) of forming the first hard coat on a surface of the second hard coat formed in the step (2).

13. A method for producing the molded body according to claim 1, comprising:
a step (1c) of molding a curable resin to produce the substrate;
a step (2) of forming the second hard coat on a part or all of a surface of the substrate obtained in the step (1c); and
a step (3) of forming the first hard coat on a surface of the second hard coat formed in the step (2).

14. A molded body, comprising: a resin substrate,
wherein the substrate has a three-dimensional shape,
wherein a part or all of a surface of the substrate is coated with a hard coat,
wherein the hard coat comprises, from a surface layer side, a first hard coat layer and a second hard coat layer,
wherein the first hard coat is formed of a coating material containing no inorganic particles,
wherein the second hard coat is formed of a coating material containing inorganic particles, and
wherein the following (i) and (ii) are satisfied:
(i) a total light transmittance of the molded body of 85% or more; and (ii) a pencil hardness on the first hard coat surface of the molded body of 5H or more.

15. An article comprising the molded body according to claim 14.

16. The molded body according to claim 14, wherein the following (iii) and (iv) are satisfied:
  (iii) a water contact angle at the first hard coat surface of 100° or more; and
  (iv) a water contact angle at the first hard coat surface after 20,000 reciprocating wipes with a cotton of 100° or more.

17. The molded body according to claim 16, wherein the thickness of the first hard coat is from 0.5 to 5 μm.

18. The molded body according to claim 16, wherein the thickness of the second hard coat is from 5 to 30 μm.

19. The molded body according to claim 16, wherein the thickness of the first hard coat is from 0.5 to 5 μm, and the second hard coat is from 5 to 30 μm.

20. A molded body, comprising: a resin substrate,
  wherein the substrate has a three-dimensional shape,
  wherein a part or all of a surface of the substrate is coated with a hard coat,
  wherein the hard coat comprises, from a surface layer side, a first hard coat layer and a second hard coat layer,
  wherein the first hard coat is formed of a coating material containing no inorganic particles,
  wherein the second hard coat is formed of a coating material containing inorganic particles, and
  wherein the following (iii) and (iv) are satisfied:
    (iii) a water contact angle at the first hard coat surface of 100° or more; and
    (iv) a water contact angle at the first hard coat surface after 20,000 reciprocating wipes with a cotton of 100° or more.

21. An article comprising the molded body according to claim 20.

* * * * *